United States Patent
Filippi et al.

(10) Patent No.: US 11,392,590 B2
(45) Date of Patent: *Jul. 19, 2022

(54) TRIGGERING ALERTS FROM SEARCHES ON EVENTS

(71) Applicant: Splunk Inc., San Francisco, CA (US)

(72) Inventors: Nicholas John Filippi, Atherton, CA (US); Katherine Kyle Feeney, Oakland, CA (US); Cory Eugene Burke, San Bruno, CA (US); Abhinav Prasad Nekkanti, Daly City, CA (US); Marc Vincent Robichaud, San Francisco, CA (US); Irina Korobova, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/260,998

(22) Filed: Jan. 29, 2019

(65) Prior Publication Data

US 2019/0179824 A1    Jun. 13, 2019

Related U.S. Application Data

(63) Continuation of application No. 14/528,905, filed on Oct. 30, 2014, now Pat. No. 10,223,423.

(Continued)

(51) Int. Cl.
| | |
|---|---|
| G06F 16/20 | (2019.01) |
| G06F 16/2455 | (2019.01) |
| G06F 11/07 | (2006.01) |
| H04L 41/0631 | (2022.01) |
| G06F 11/00 | (2006.01) |
| G06Q 10/00 | (2012.01) |

(Continued)

(52) U.S. Cl.
CPC ........ *G06F 16/24565* (2019.01); *G06F 9/542* (2013.01); *G06F 11/00* (2013.01); *G06F 11/0709* (2013.01); *G06F 11/0751* (2013.01); *G06F 11/0766* (2013.01); *G06F 16/9536* (2019.01); *G06Q 10/00* (2013.01); *H04L 41/00* (2013.01); *H04L 41/0631* (2013.01); *G06F 16/00* (2019.01); *G06F 16/254* (2019.01)

(58) Field of Classification Search
None
See application file for complete search history.

(56) References Cited

U.S. PATENT DOCUMENTS 5,911,138 A * 6/1999 Li ........................ G06F 16/248
6,002,347 A    12/1999 Daly et al.
(Continued)

*Primary Examiner* — Jau Shya Meng
(74) *Attorney, Agent, or Firm* — Shook, Hardy & Bacon L.L.P.

(57) ABSTRACT

Custom communication alert techniques are described. A triggering condition is detected by one or more computing devices that is found by searching data using one or more extraction rules of a late-binding schema. Responsive to the detection of the triggering condition of the alert, a communication is formed by the one or more computing devices that corresponds to the alert and that includes one or more tokens based on one or more values of the data taken from fields defined by the one or more extraction rules. The communication is caused to be transmitted by the one or more computing device via a network for receipt by at least one computing device of an intended recipient of the communication.

30 Claims, 24 Drawing Sheets

Related U.S. Application Data

(60) Provisional application No. 62/058,952, filed on Oct. 2, 2014.

(51) Int. Cl.
*H04L 41/00* (2022.01)
*G06F 16/9536* (2019.01)
*G06F 9/54* (2006.01)
*G06F 16/00* (2019.01)
*G06F 16/25* (2019.01)

(56) References Cited

U.S. PATENT DOCUMENTS

| | | |
|---|---|---|
| 2002/0120350 A1 | 8/2002 | Klass et al. |
| 2002/0156785 A1* | 10/2002 | Kumar ................. G06F 11/079 |
| 2003/0149727 A1 | 8/2003 | Jaschek et al. |
| 2003/0229613 A1* | 12/2003 | Zargham ................. H04Q 3/66 |
| 2005/0138111 A1 | 6/2005 | Aton et al. |
| 2005/0259657 A1 | 11/2005 | Gassoway |
| 2008/0082962 A1 | 4/2008 | Falk et al. |
| 2008/0109370 A1* | 5/2008 | Moshir ................. G06Q 30/06 705/64 |
| 2008/0319991 A1* | 12/2008 | Ross ................. G06F 16/3349 |
| 2010/0122220 A1* | 5/2010 | Ainsworth ............ G06F 16/957 715/866 |
| 2013/0291060 A1* | 10/2013 | Moore ................. G16H 40/63 726/1 |
| 2014/0055880 A1* | 2/2014 | Jhatakia ............. G06F 11/3485 360/31 |
| 2014/0156829 A1 | 6/2014 | Lee et al. |
| 2014/0188398 A1* | 7/2014 | Cohen ................. A61B 5/0015 702/19 |
| 2014/0297547 A1 | 10/2014 | Kruglick |
| 2014/0304811 A1 | 10/2014 | Rodgers et al. |

\* cited by examiner

500

Original Search: 501
search "error | stats count BY host

Sent to peers: 502
search "error | prestats count BY host (map)

Executed by search head: 503
Merge prestats results received from peers (reduce)

Fig. 6B

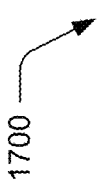

Fig. 17A

| Search | |
|---|---|
| Token | Description |
| $app$ | Name of the app containing the search |
| $cron_schedule$ | Cron schedule for the app |
| $description$ | Description of the search |
| $name$ | Name of the search |
| $next_scheduled_time$ | The next time the search runs |
| $owner$ | Owner of the search |
| $results_link$ | Link to the search results |
| $search$ | The actual search |
| $trigger_date$ | The date that triggers the alert |
| $trigger_time$ | The scheduled time the alert runs |
| $type$ | Run as alert, report, view, search command |
| $view_link$ | Link to view the saved report |
| $alert_expires$ | Time the alert expires |

| Job | |
|---|---|
| Token | Description |
| $job.earliestTime$ | Initial time a search job starts |
| $job.latestTime$ | Latest time recorded for the search job |
| $job.messages$ | List of error and debug messages generated by the search job |
| $job.resultCount$ | Number of results returned by the search job |
| $job.runDuration$ | Time, in seconds, that the search took to complete |
| $job.sid$ | Search ID |
| $job.label$ | Name given to the search job |

| Server | |
|---|---|
| Token | Description |
| $server.build$ | Build number of the Splunk Enterprise instance |
| $server.serverName$ | Server name hosting the Splunk Enterprise instance |
| $server.version$ | Version number of the Splunk Enterprise instance |

| Results | |
|---|---|
| Token | Description |
| $result.<fieldName>$ | Results are referenced directly by their field name. Only the first result of the search is tokenized |

1700

1750

| Token | Description |
|---|---|
| $action.email.hostname$ | Hostname of the email server. |
| $action.email.priority$ | Priority of the search. |
| $app$ | Name of the app containing the search |
| $cron_schedule$ | Cron schedule for the app. |
| $description$ | Description of the search. |
| $name$ | Name of the search. |
| $next_scheduled_time$ | The next time the search runs. |
| $owner$ | Owner of the search. |
| $results_link$ | (Alert actions and scheduled reports only) Link to the search results. |
| $search$ | The actual search. |
| $trigger_date$ | (Alert actions only) The date that triggers the alert. |
| $trigger_time$ | (Alert actions only) The scheduled time the alert runs. |
| $type$ | Indicates if the search is from an alert, report, view, or the search command. |
| $view_link$ | Link to view the saved report. |
| $alert.severity$ | Severity level of the alert. |
| $alert.expires$ | Time the alert expires. |

| Token | Description |
|---|---|
| $job.earliestTime$ | Initial time a search job starts. |
| $job.eventSearch$ | Subset of the search that contains the part of the search before any transforming commands. |
| $job.latestTime$ | Latest time recorded for the search job. |
| $job.messages$ | List of error and debug messages generated by the search job. |
| $job.resultCount$ | Number of results returned by the search job. |
| $job.runDuration$ | Time, in seconds, that the search took to complete. |
| $job.sid$ | Search ID. |
| $job.label$ | Name given to the search job. |

1902
Detect a triggering condition of an alert by one or more computing devices found by searching data using one or more extraction rules of a late-binding schema

↓

1904
Responsive to the detecting of the triggering condition of the alert, form a communication corresponding to the alert by the one or more computing devices that includes one or more tokens based on one or more values of the data taken from fields defined by the one or more extraction rules

↓

1906
Cause the communication to be transmitted by the one or more computing devices via a network for receipt by at least one computing device of an intended recipient of the communication

*Fig. 19*

TRIGGERING ALERTS FROM SEARCHES ON EVENTS

CROSS-REFERENCE TO RELATED APPLICATIONS

This application is a continuation of, and claims priority to, U.S. patent application Ser. No. 14/528,905 filed Oct. 30, 2014 and titled "CUSTOM COMMUNICATION ALERTS," which claims priority under 35 U.S.C. Section 119(e) as a non-provisional application of U.S. Provisional Application No. 62/058,952, filed Oct. 2, 2014, and titled "Custom Communication Alerts." The contents of which of the foregoing are herein incorporated by reference in their entirety.

BACKGROUND

Businesses and their data analysts face the challenge of making sense of and finding patterns in the increasingly large amounts of data in the many types and formats that such businesses generate and collect. For example, accessing computer networks and transmitting electronic communications across the networks generates massive amounts of data, including such types of data as machine data and Web logs. Identifying patterns in this data, once thought relatively useless, has proven to be of great value to the businesses. In some instances, pattern analysis can indicate which patterns are normal and which ones are unusual. For example, detecting unusual patterns can allow a computer system manager to investigate the circumstances and determine whether a computer system security threat exists.

Additionally, analysis of the data allows businesses to understand how their employees, potential consumers, and/or Web visitors use the company's online resources. Such analysis can provide businesses with operational intelligence, business intelligence, and an ability to better manage their IT resources. For instance, such analysis may enable a business to better retain customers, meet customer needs, or improve the efficiency of the company's IT resources. Despite the value that one can derive from the underlying data described, making sense of this data to realize that value takes effort. In particular, patterns in underlying data may be difficult to identify or understand when analyzing specific behaviors in isolation, often resulting in the failure of a data analyst to notice valuable correlations in the data from which a business can draw strategic insight.

SUMMARY

Custom communication alert techniques are described. In one or more implementations, a triggering condition is detected by one or more computing devices that is found by searching data using one or more extraction rules of a late-binding schema. Responsive to the detection of the triggering condition of the alert, a communication is formed by the one or more computing devices that corresponds to the alert and that includes one or more tokens based on one or more values of the data taken from fields defined by the one or more extraction rules. The communication is caused to be transmitted by the one or more computing devices via a network for receipt by at least one computing device of an intended recipient of the communication.

In one or more implementations, inputs are received by at least one computing device that specify a triggering condition of an alert to be triggered by evaluating data using one or more extraction rules of a late-binding schema. Inputs are also received, by the at least one computing device, that specify a communication that is to be formed for the alert upon detection of the triggering condition, the communication specified to include one or more values of the evaluated data taken from fields defined by the one or more extraction rules of the late-binding schema In one or more implementations, a user interface is exposed that is configured to receive inputs, by at least one computing device, that specify a triggering condition of an alert to be triggered by evaluating data using one or more extraction rules of a late-binding schema. A user interface is also exposed that is configured to receive inputs, by the at least one computing device, specifying a communication that is to be formed for the alert upon detection of the triggering condition, the communication specified to include one or more values of the evaluated data taken from fields defined by the one or more extraction rules of the late-binding schema.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

Entities represented in the figures may be indicative of one or more entities and thus reference may be made interchangeably to single or plural forms of the entities in the discussion.

FIG. 6B illustrates a data summary dialog that enables a user to select various data sources in accordance with the disclosed implementations.

FIG. 17A depicts a table showing example of common tokens relating to search, job, server, and results FIG. 17B depicts a table showing tokens related to search metadata.

FIG. 18 depicts a table showing tokens related to a search job.

FIG. 19 is a flow diagram depicting a procedure in an example implementation in which detection of a triggering condition causes formation of a communication that includes one or more tokens based on one or more values of data taken from field defined by one or more extraction rules.

DETAILED DESCRIPTION

Overview

Figure 1:
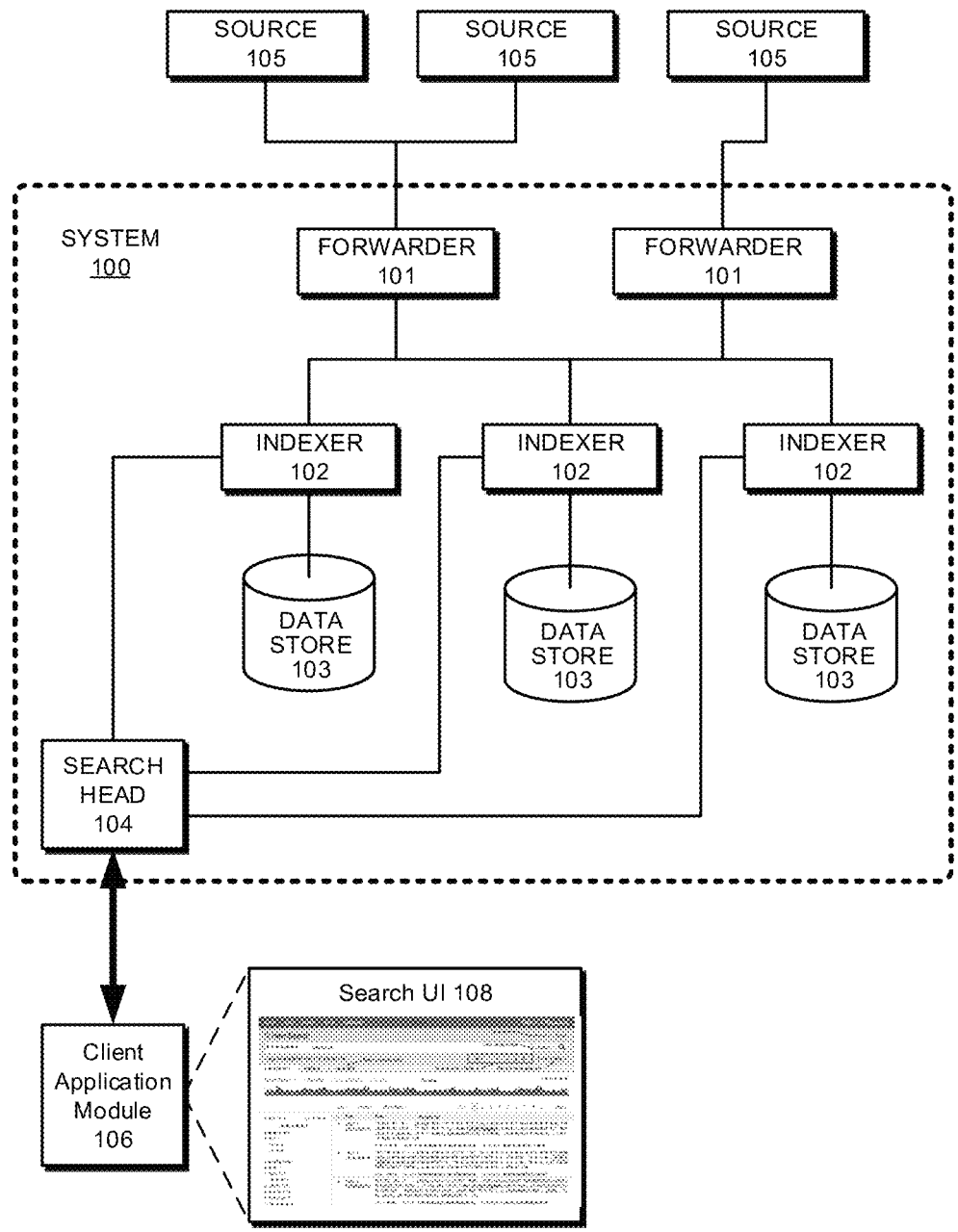
FIG. 1 presents a block diagram of an event-processing system in accordance with the disclosed implementations.

Communication of alerts has become a central part of analysis of large amounts of data. For example, an alert may be configured to cause a communication to be sent when a failure has occurred. Conventional techniques that are utilized to form these communications, however, are typically static and thus may provide limited amounts of information regarding the alert.

Custom communication alert techniques are described. In one or more implementations, communications that are transmitted upon occurrence of a triggering condition of an alert may include tokens that are based on values of fields used to perform a search. This may include values of fields taken directly from the data (e.g., a user name) or indirectly based on the values, e.g., use of a lookup table to find a user's legal name that corresponds to the user name which may then be included in the communication. In this way, a communication may be created dynamically and support rich inclusion of content, further discussion of which may be found in the following sections.

In the following discussion, an example environment is first described that may employ the techniques described herein. Example alerts and procedures are then described which may be performed in the example environment as well as other environments. Consequently, performance of the example alerts and procedures is not limited to the example environment and the example environment is not limited to performance of the example alerts and procedures.

Example Environment

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK®

ENTERPRISE system, the techniques are also applicable to other types of data server systems.

In the SPLUNK® ENTERPRISE system, performance data is stored as "events," in which each event comprises a collection of performance data and/or diagnostic information that is generated by a computer system and is correlated with a specific point in time. Events can be derived from "time series data," in which time series data includes a sequence of data points (e.g., performance measurements from a computer system) that are associated with successive points in time and are typically spaced at uniform time intervals. Events can also be derived from "structured" or "unstructured" data. Structured data has a predefined format, in which specific data items with specific data formats reside at predefined locations in the data. For example, structured data can include data items stored in fields in a database table. In contrast, unstructured data does not have a predefined format. This means that unstructured data can include various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, in which the flexible schema may be developed and redefined as needed. Note that a flexible schema may be applied to event data "on the fly" as desired (e.g., at search time), rather than at ingestion time of the data as in traditional database systems. Because the schema is not applied to event data until it is desired (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule includes a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an exemplary event-processing system 100, similar to the SPLUNK® ENTERPRISE system. System 100 includes one or more forwarders 101 that represent functionality to collect data and one or more indexers 102 that represent functionality to store, process, and/or perform operations on this data, in which each indexer may operate on data contained in a specific data store 103. A search head 104 may also be provided that represents functionality to obtain and process search requests from clients and provide results of the search back to the clients, additional details of which are discussed in relation to FIGS. 3 and 4. The forwarders 101, indexers 102, and/or search head 104 may be configured as separate computer systems in a data center, or alternatively may be configured as separate processes implemented via one or more individual computer systems. Data that is collected via the forwarders may be obtained from a variety of different data sources 105.

As further illustrated, the search head 104 may interact with a client application module 106 associated with a client device, such as to obtain search queries and supply search results or other suitable data back to the client application module 106 that is effective to enable the client application module 106 to form search user interfaces 108 through which different views of the data may be exposed. Various examples and details regarding search user interfaces 108, client application modules 106, search queries, and operation of the various components illustrated in FIG. 1 are discussed throughout this document.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
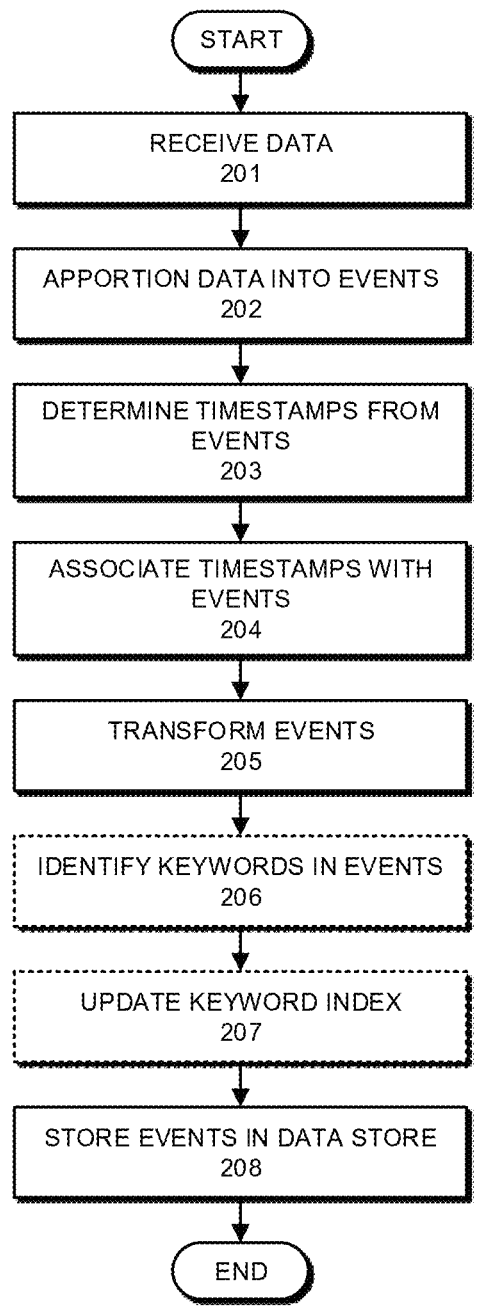
FIG. 2 presents a flowchart illustrating how indexers process, index, and store data received from forwarders in accordance with the disclosed implementations.

FIG. 2 presents a flowchart 200 illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, in which the indexer can be explicitly informed about the source of the data or can infer the source of the data by examining the data. These heuristic rules can include regular expression-based rules or delimiter-based rules for determining event boundaries, in which the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, in which each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. application patent Ser. No. 14/266,817 also filed on 30 Apr. 2014.

1.4 Query Processing

Figure 3:
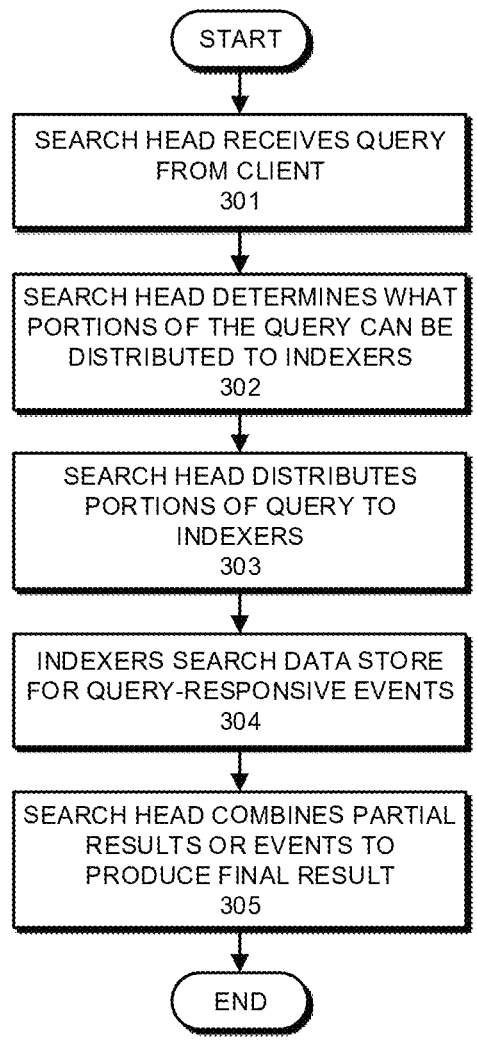
FIG. 3 presents a flowchart illustrating how a search head and indexers perform a search query in accordance with the disclosed implementations.

FIG. 3 presents a flowchart 300 illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
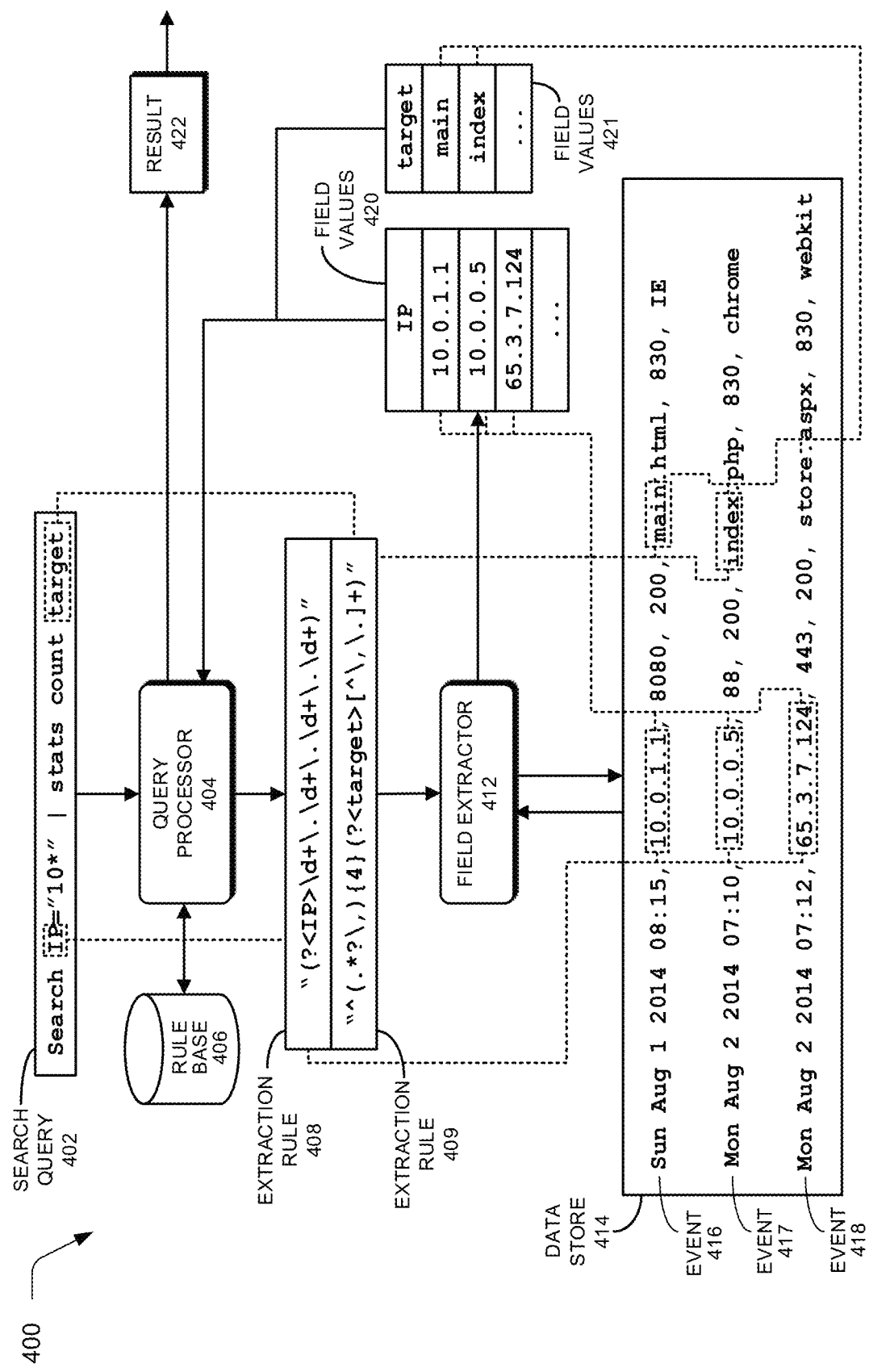
FIG. 4 presents a block diagram of a system for processing search requests that uses extraction rules for field values in accordance with the disclosed implementations.

FIG. 4 presents a block diagram 400 illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, in which rule base 406 maps field names to corresponding extraction rules and obtains extraction rules 408-409, extraction rule 408 specifies how to extract a value for the "IP" field from an event, and extraction rule 409 specifies how to extract a value for the "target" field from an event. As is illustrated in FIG. 4, extraction rules 408-409 can include regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Example Search Screen

Figure 6A:
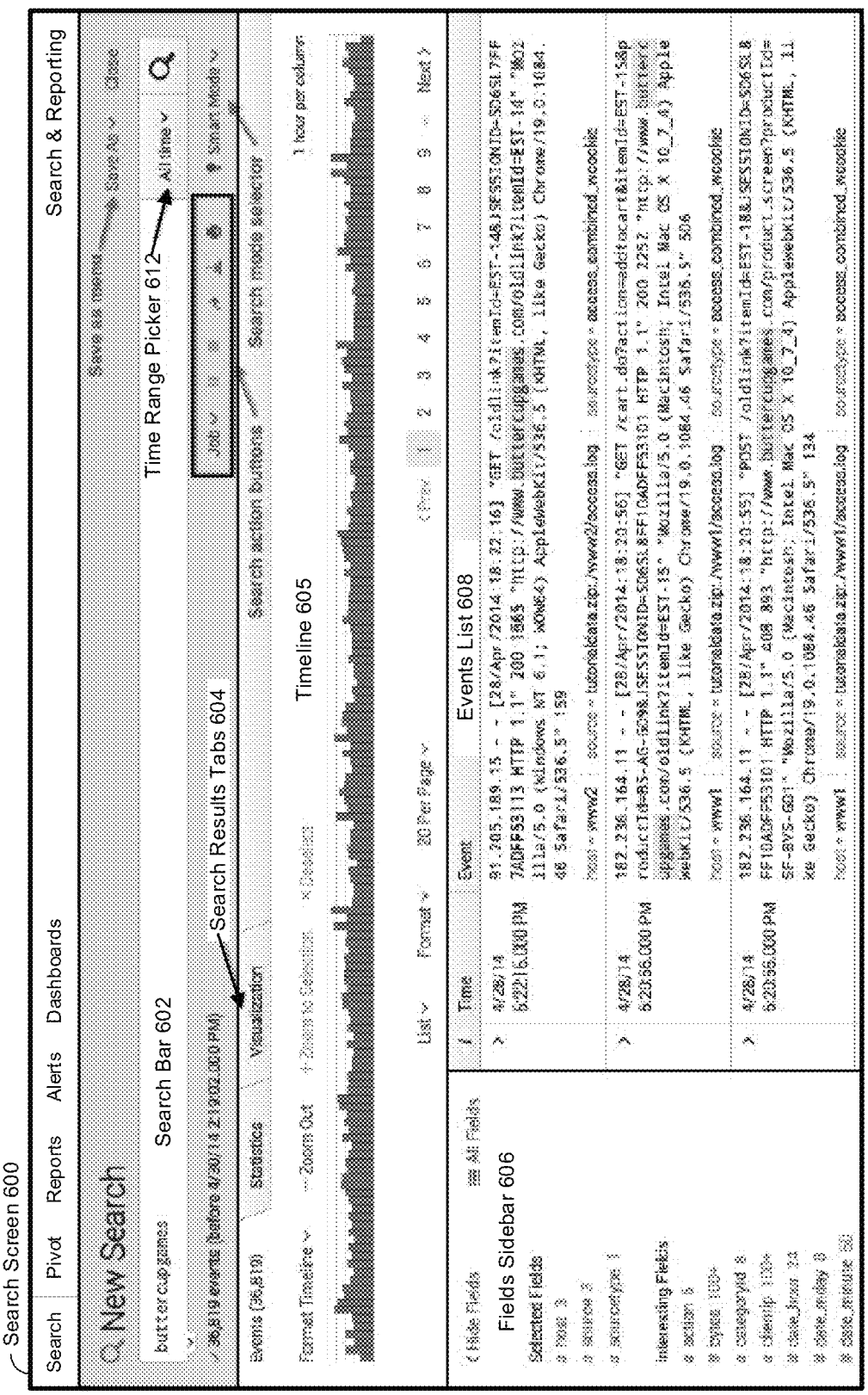
FIG. 6A illustrates a search screen in accordance with the disclosed implementations.
Figure 6B:
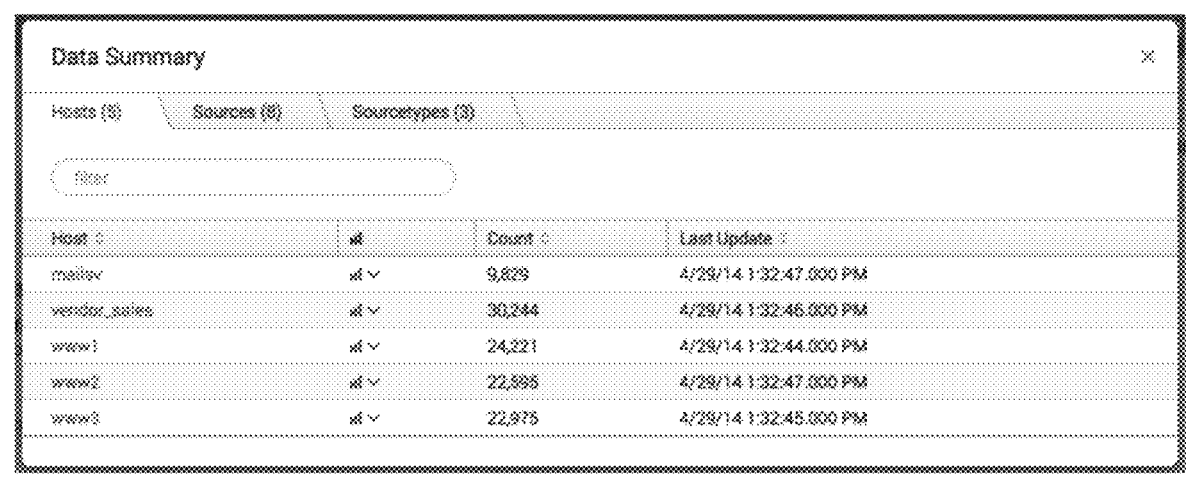

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

Figure 5:
FIG. 5 illustrates an exemplary search query received from a client and executed by search peers in accordance with the disclosed implementations.

To facilitate faster query processing, a query can be structured as a map-reduce computation, wherein the "map" operations are delegated to the indexers, while the corresponding "reduce" operations are performed locally at the search head. For example, FIG. 5 illustrates an example 500 of how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts 200, 300 in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process each of the events that have a specific field-value combination, the system can use the references in the summarization table entry to directly access the events to extract further information without having to search each of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, in which the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field.

A collection query can be initiated by a user, or can be scheduled to occur automatically at specific time intervals. A collection query can also be automatically launched in response to a query that asks for a specific field-value combination.

In some cases, the summarization tables may not cover each of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
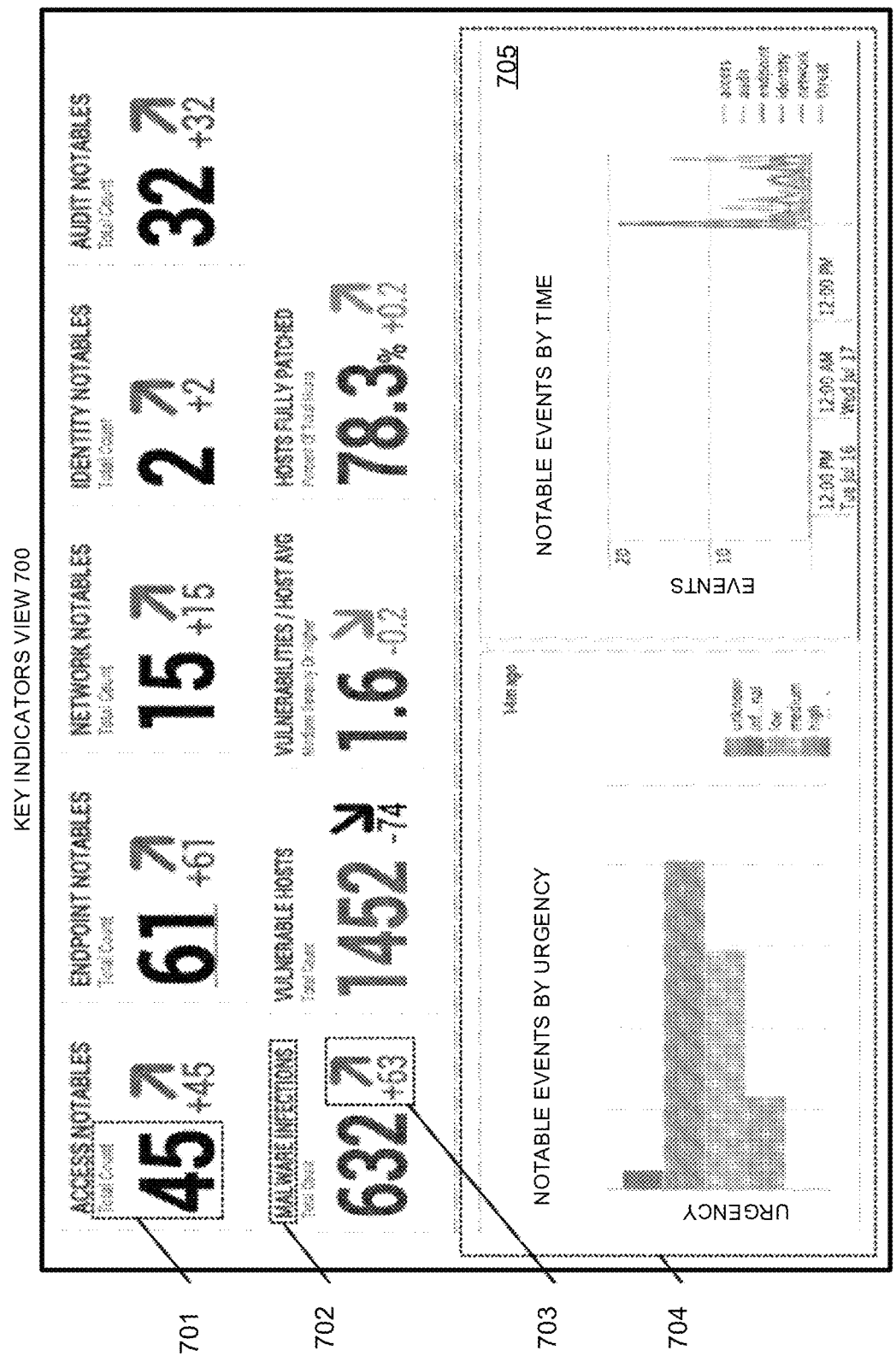
FIG. 7A illustrates a key indicators view in accordance with the disclosed implementations.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 705 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 7B:
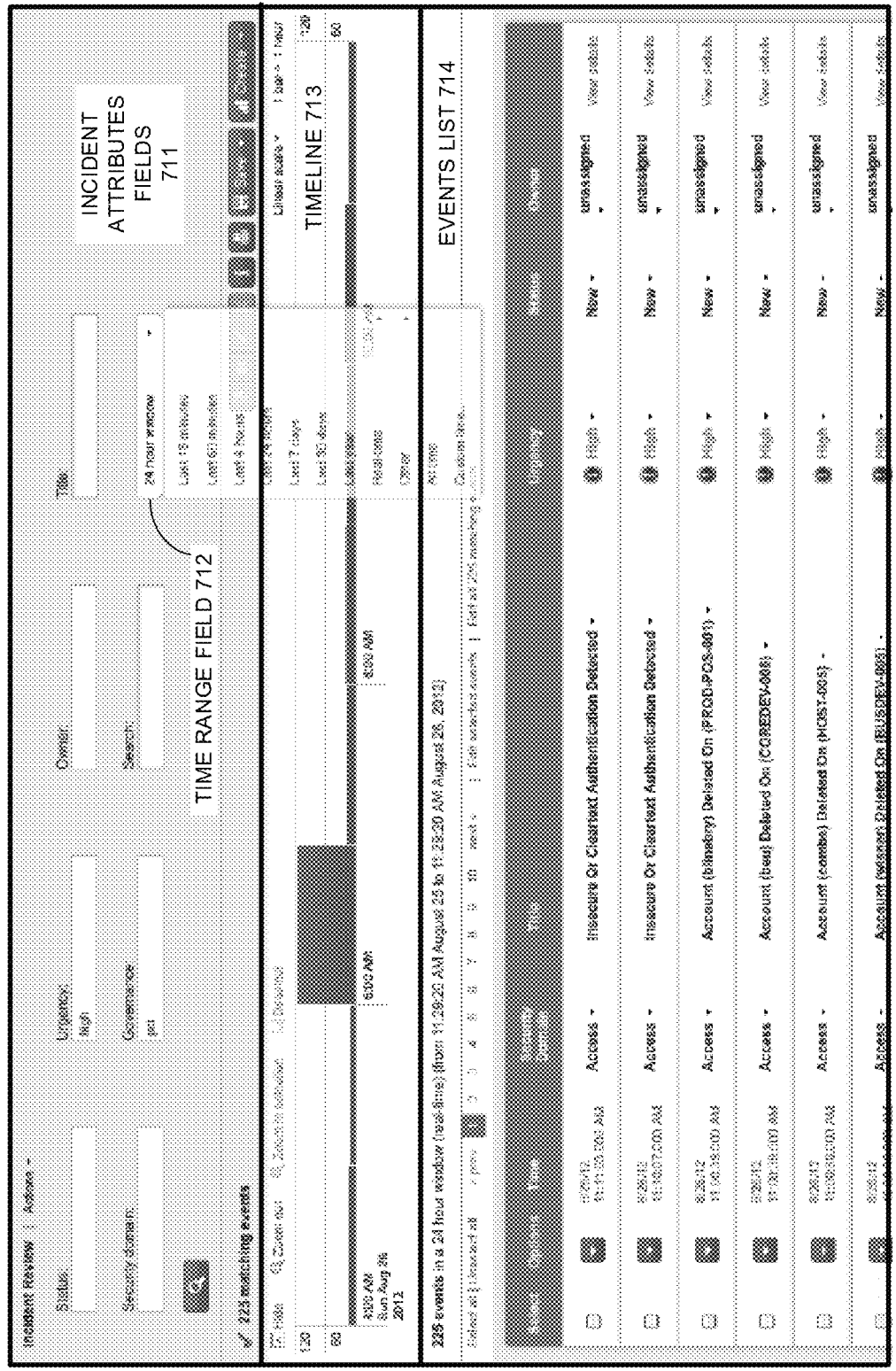
FIG. 7B illustrates an incident review dashboard in accordance with the disclosed implementations.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of each of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 7C:
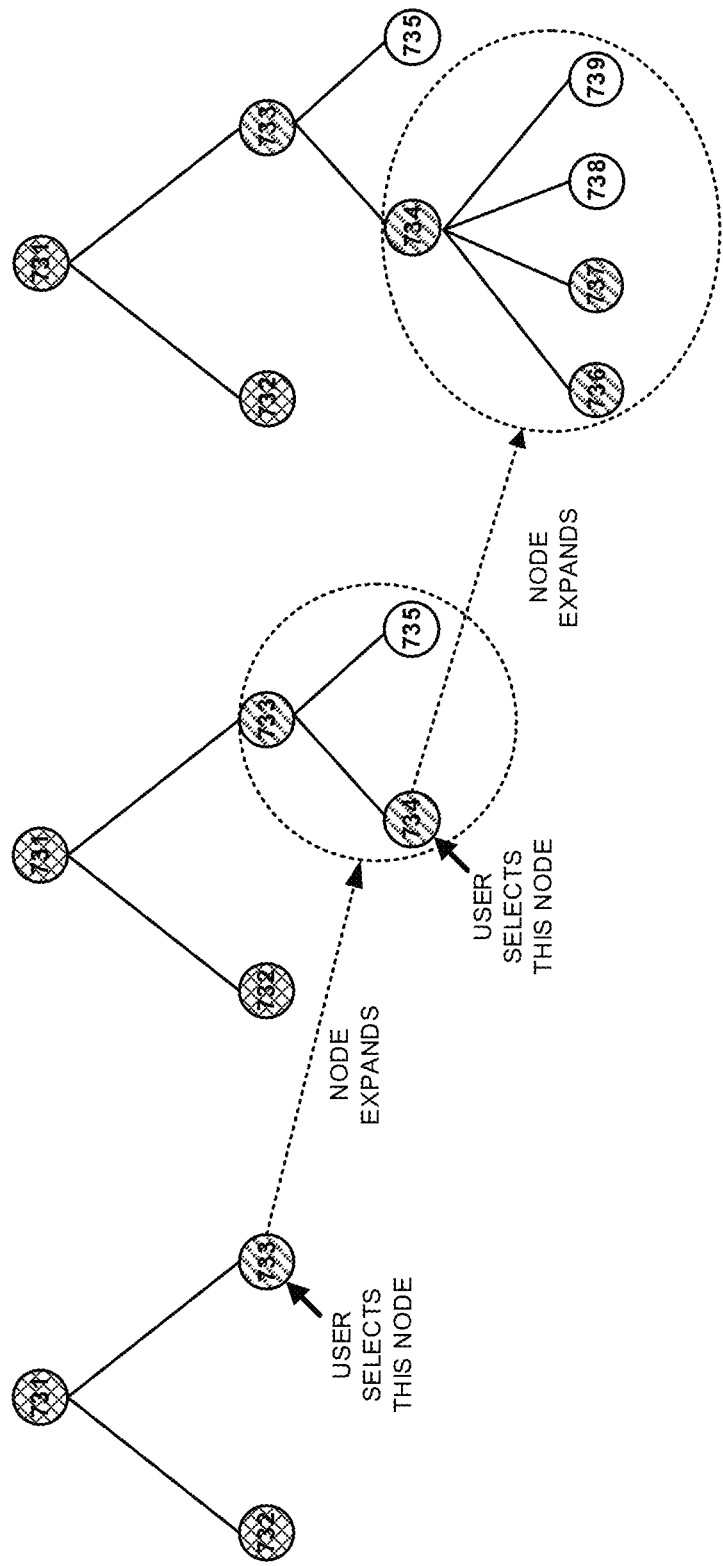
FIG. 7C illustrates a proactive monitoring tree in accordance with the disclosed implementations.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 7C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
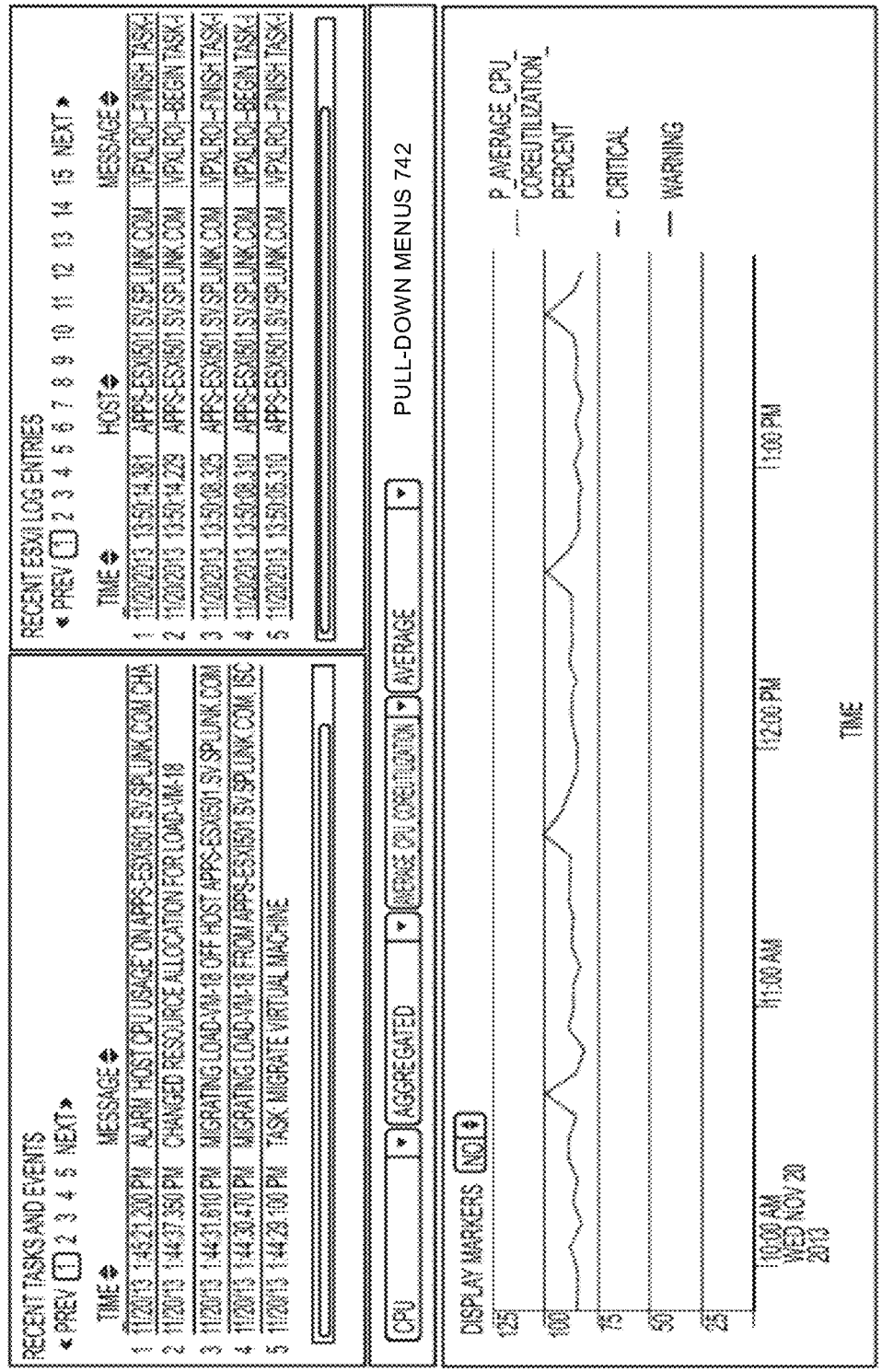
FIG. 7D illustrates a screen displaying both log data and performance data in accordance with the disclosed implementations.

The SPLUNK® APP FOR VMWARE ® also provides a user interface that enables a user to select a specific time range and then view heterogeneous data, comprising events, log data and associated performance metrics, for the selected time range. For example, the screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

Alert Techniques

Alerts may be used to notify users as to an occurrence of a triggering condition identified through a search of data, such as raw data, machine data, performance data, diagnostic information, transformed data, or mashup data combined from a plurality of sources. As such, search is a basis for how to construct alerts. For example, the techniques described above may be utilized to perform a search of web logs to determine whether there are failures to download an item. This may include use of logic to determine an amount of failures in a given time, and so on. Once this occurs, a communication may be utilized to automatically notify a user, such as customer support personnel, that a user initiated the failed download, and so on. Thus, an alert may have a triggering condition found by search data using one or more extraction rules of a late-binding schema as described above.

Figure 8:
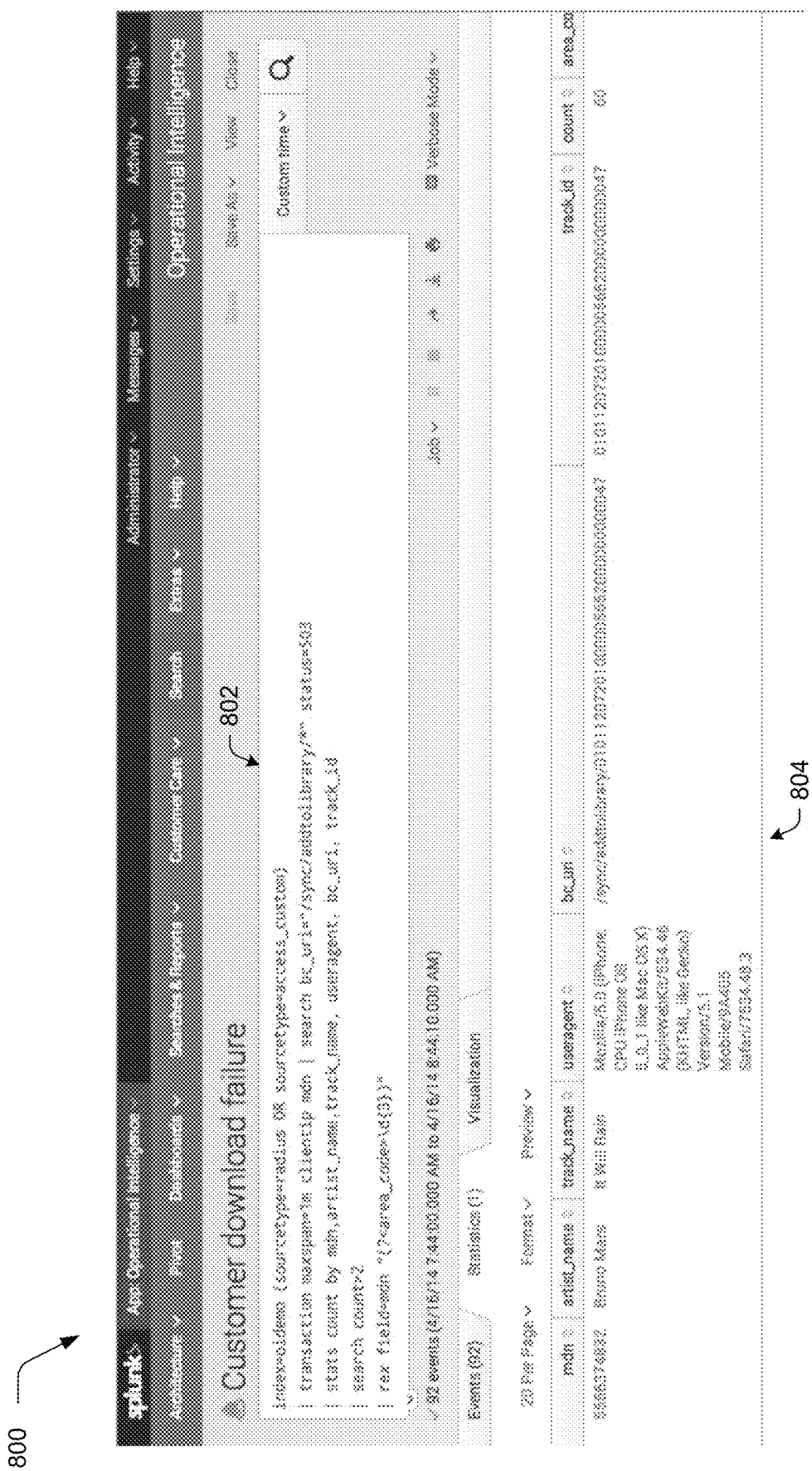
FIG. 8 depicts an example of a user interface involving identification of a customer download failure.

FIG. 8 depicts an example of a user interface 800 involving identification of a customer download failure. The user interface 800 includes search criteria 802 resulting from a search indicating customer download failure of a particular track of an artist. Values 804 from fields extracted by extraction rules from a raw event are also shown that indicate the artist name, track name, information regarding a customer that attempted the download, a URL associated with the download, and so on. This search may be used as a basis to create an alert, further discussion of which may be found in the following and is shown in corresponding figures.

Figure 9:
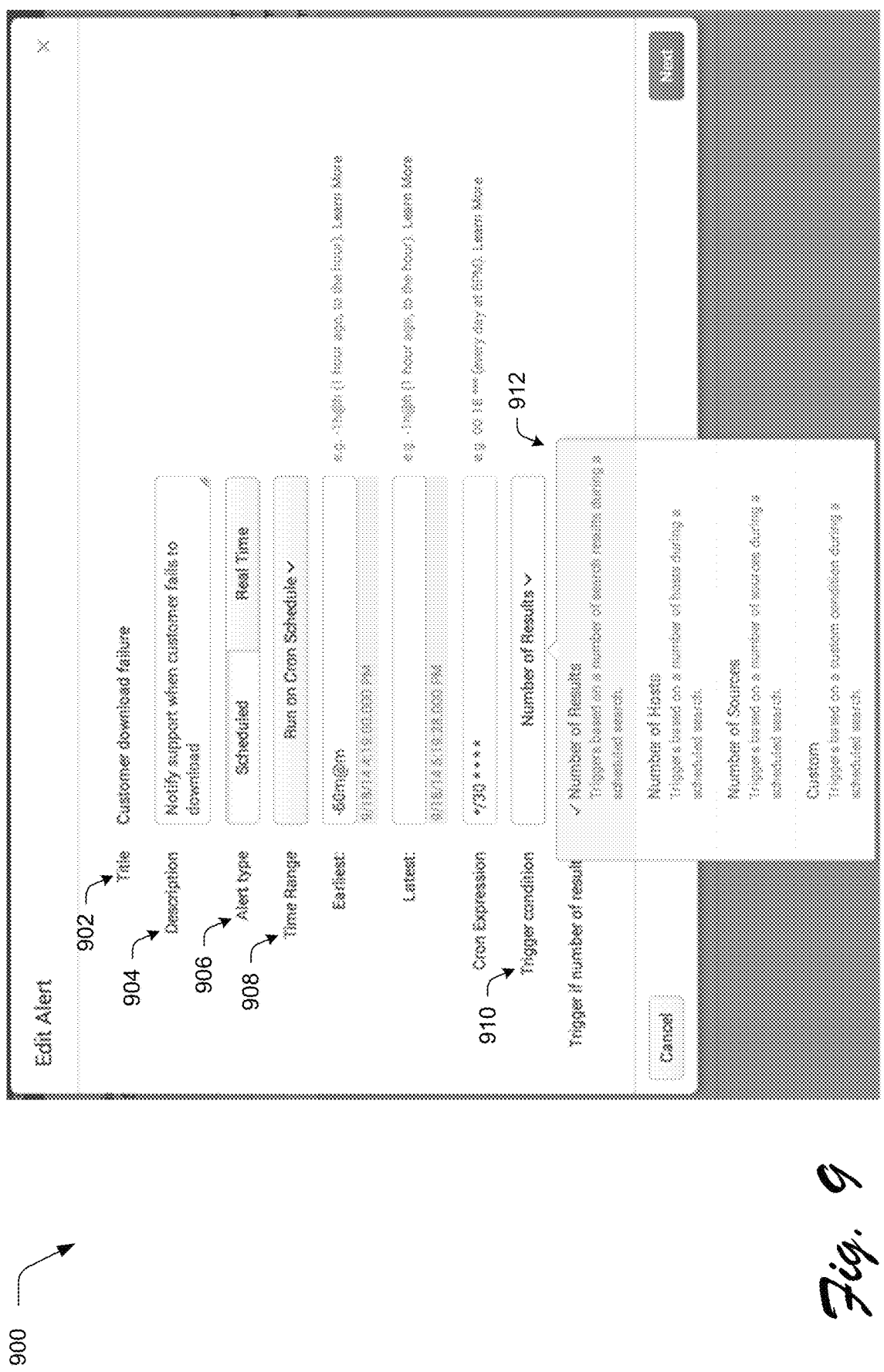
FIG. 9 depicts an example of a user interface in which an alert is created including specification of one or more triggering conditions that are to be met in a search to trigger the alert.

FIG. 9 depicts an example of a user interface 900 in which an alert is created including specification of one or more triggering conditions that are to be met in a search to trigger the alert. The user interface 900 includes a title 902 option via which a user may specify a title for the alert, which is illustrated as "Customer download failure" in this example. The user interface 900 also includes a description 904 option via which the user may describe a purpose or intended use of the alert, e.g., to notify support when a customer fails to download.

An alert type 906 option is also provided in the user interface 900 that is usable to specify when the search and detection of a triggering condition is to be performed. An example of an alert type 906 option is illustrated as "scheduled," in which a user may specify a particular point in time, custom interval as illustrated, and so on. Another example of an alert type 906 option is "real time" and as such, the search and detection of a corresponding triggering condition may be performed continually in real time. A time range 908 is also illustrated that is selected to indicate a time at which detect for an alert is to be performed.

The user interface 900 also includes a triggering condition 910 option to that is usable to specify triggering conditions 912 that are to be met in order to trigger the alert. An example of a triggering condition 912 includes a number of results, e.g., to specify "X" amount or search results are to be found in order to trigger the alert. Another example of a triggering condition 912 is a number of hosts, which triggers based on a number of hosts found during a search. A further example of a triggering condition 912 is a number of sources, which triggers on a number of sources found during a search. Custom triggers are also supported, which may be based on a custom condition that is met during a search. For example, customer triggers may employ logic (e.g., Boolean expression) to define the trigger condition that is to be met in order to trigger the alert.

Figure 10:
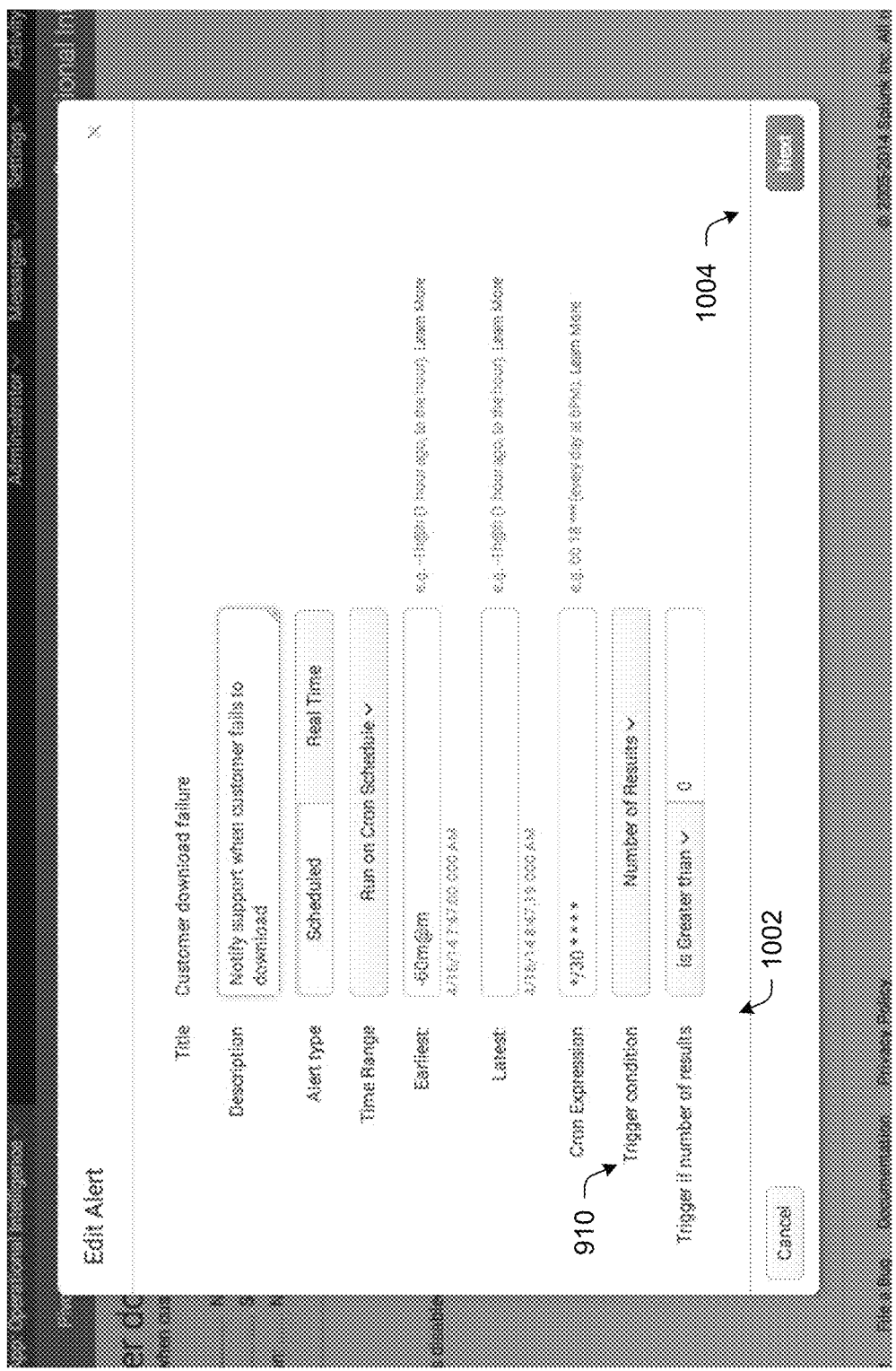
FIG. 10 depicts an example of a user interface in which a number of results triggering condition option is selected.

FIG. 10 depicts an example of a user interface 1000 in which a number of results triggering condition option is selected. Continuing with the previous example, a user selects a trigger condition 910 option that is based on a number of results. The user interface 1000 then outputs an option 1002 to specify further constraints on the triggering condition, e.g., trigger if a number of results is greater than, less than, or equal to a specified number. A user may then select a "next" option 1004 to navigate to another screen in the user interface to specify a communication that is to be formed and communicated once the triggering condition is met, further discussion of which may be found in the following and is shown in a corresponding figure.

Figure 11:
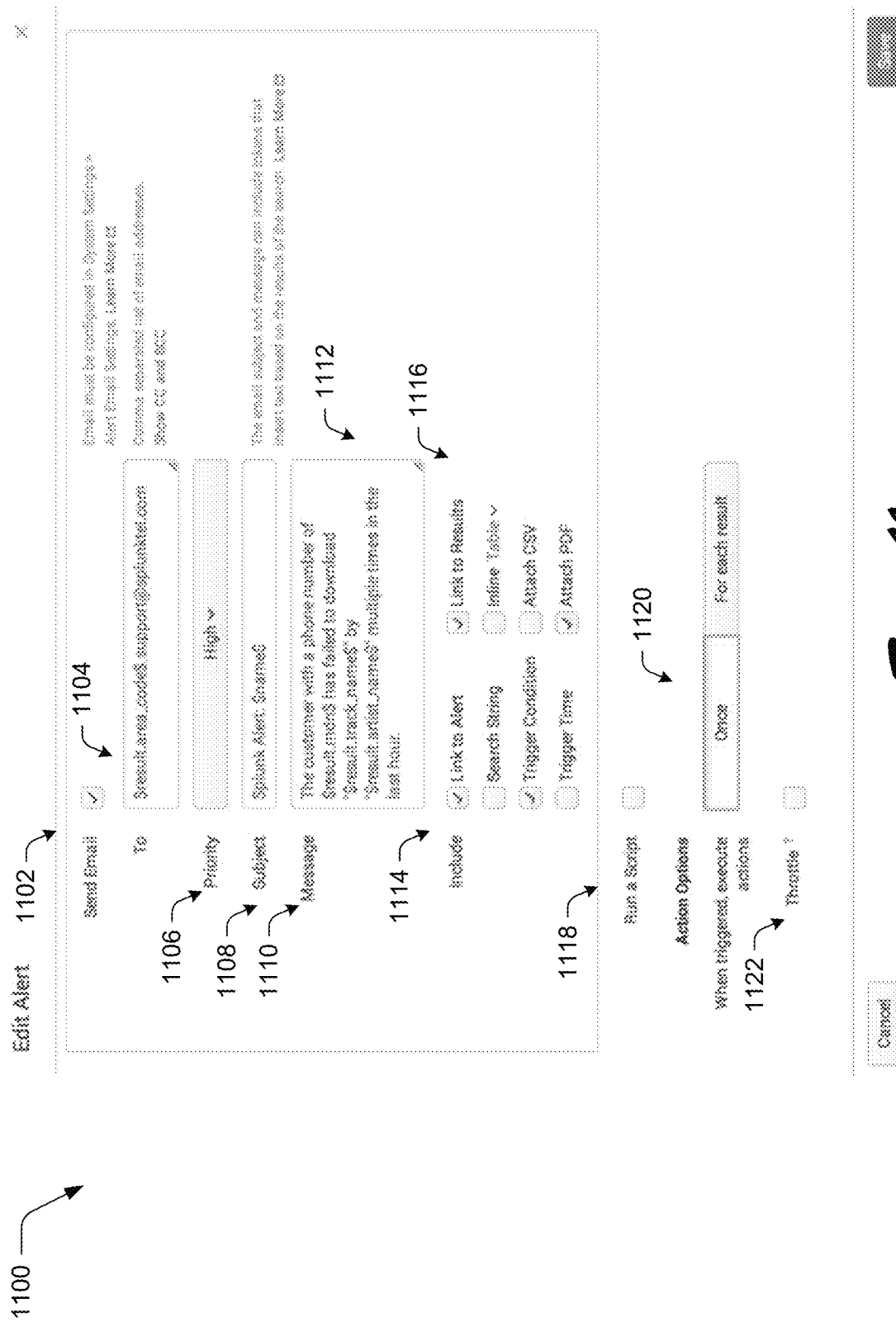
FIG. 11 depicts an example of a user interface that is configured to specify a recipient that is to receive a communication as well as a message body to be included within the communication.

FIG. 11 depicts an example of a user interface 1100 that is configured to specify a recipient that is to receive a communication as well as a message body to be included within the communication. A communication that is to be sent responsive to an alert may take a variety of forms, such as an email, an instant message, text message, social network communication (e.g., a Tweet®), and so forth. Therefore, although an example involving an email is illustrated and described, it should be readily apparent that other forms of communications are also contemplated.

A send email 1102 option is provided in the user interface 1100 to cause an email to be sent in this instance, although other options are also contemplated as described above, such as to send an instant message, text message, social network communication, and so on. A recipient 1104 option is included to specify a recipient that is to receive the communication. For example, a known recipient, such as particular support personnel may be specified. Dynamic specification of an intended recipient may also be supported, such as to base a recipient on tokens that are based on values taken from fields of the search result as further described below.

A priority 1106 option is also included in the user interface 1102 that may be utilized to assign a priority to the communication, e.g., a "high priority" and exclamation point to an email in this example. A subject line 1108 option is also included, via which, a user may specify a subject line for the communication. As above, this may include specification of a static subject line (e.g., "Download Failure") or a dynamic subject line. The dynamic subject line, for instance, may also leverage tokens that are based directly or indirectly on values of the data taken from fields defined by the extraction rules used to perform the search, such as to include a user's account name, phone number, location, and any other data that may be taken from the search results as further described below.

The user interface 1100 also includes a message 1110 option via which a user may specify a message body 1112 of the communication that is to be sent upon triggering of the alert. In the illustrated example, for instance, a user has specified verbiage (e.g., "The customer with a phone number of") along with tokens to create a dynamic message body for inclusion in the message body 1112, e.g., a name of an artist, track, and indication of a result. Thus, like above, the tokens included in the message body 1112 may be based directly or indirectly on the values for the fields resulting from the search.

For a subject field, for instance, a default option may be provided in which a number of an alert is used for the subject. Other tokens may also be used, such as to describe a search that triggered an alert, a severity level of an alert, a number of results returned by a search, a URL via which users may view results, an absolute path to a results file, a search ID of a search that triggered the alert, and so forth.

Thus, tokens are a type of variable that represents data generated by a search, which may be used in fields of a communication such as "To," "Cc," "Bcc," "Subject," "Message," "Footer," and so on. An example of syntax for access to a value of a token is shown as follows:

$<token-name>$

For example, the following token may be placed in the subject field of a communication to reference a search ID of a search.

Search results from $job.sid$

There are a variety of different categories of tokens that may be used to access data generated from a search, e.g., based on different usage contexts for the tokens. For example, a search metadata category may include information about the search and include contexts such as alert actions from search, scheduled reports, scheduled delivery of dashboards, and so on. A search results category may include access results of a search, which may include contexts such as alert actions from search and scheduled reports. A job information category includes data specific to a search job, and may include contexts such as alert actions from search and scheduled reports. Additionally, a server information category may include information from an enterprise service, and include context such as alert action from search, scheduled reports, scheduled delivery of dashboards, and so forth. Tokens may also be created from data from a file accessible by the system.

Tokens may provide access to a variety of different information. Examples of common tokens relating to search, job, server, and results are shown in tables 1700 of FIG. 17A. Tokens taken from a search relate to data of the search itself, whereas job tokens relate to job information that is specified for a search job. Tokens related to server information describe servers used to perform and process the search and related data and tokens taken from results are referenced directly by their field name.

Additional examples of search metadata as shown in a table 1750 of FIG. 17B, taken from results by using "result.<fieldname>" token to access a first value of a specified field in search results, to access job information that is specified for a search job (e.g., a search ID or messages generated by the search job) as shown in table 1800 of FIG. 18, may include tokens available from a server, and so forth.

As illustrated, for instance, a "$result.area_code$" field is included to specify a recipient using a value taken from that field that is included in the search result. Thus, a token may be based directly on the value supplied for the field from the data. The token may also be formed using processing that is based on the values taken from the fields. For example, values from multiple fields may be combined to form a single token that is used to specify the recipient, such as a user name and domain for an email address. In another example, the processing may leverage a lookup table, such as to lookup a user's name to gain a phone number for a text message and vice versa. Thus, tokens may be based directly or indirectly on values of the data taken from fields defined by the extraction rules used to perform the search. In this way, a plurality of values of fields defined by extraction rules may be from a specific event, and each alert that uses the values extracted from the same fields defined by those extraction rules may correspond to a different event. Further, in instances of generation of statistics or aggregation, values may be extracted from the same event or multiple events. Tokens may also be utilized as part of formation of other parts of the communication, such as a subject line and/or message body as further described below.

Returning again to FIG. 11, the user interface 1100 also includes options 1114 and formats 1116 that may be selected to configure the communication. The options 1114 include options to include within the message body 1112 of the communication a link to the alert (e.g., a URL in a body of the communication), a search string (e.g., a search query used to perform the search may be included in a header or body of the communication), text describing the trigger condition (e.g., a natural language description of what causes the condition to be triggered), a time the trigger condition is triggered, and so on. The formats 1116 include option to include a link to the results, include the results inline in the message body 1112 (e.g., as HTML, ASCII, CSV), attach the results as a CSV or PDF, and so on.

An action option 1120 is also included to specify when the communication is to be sent. For example, the action option 1120 may be selected to specify that the communication is to be sent once (e.g., for a batch of triggering conditions that are met) or for each result, e.g., to each user that is involved in the triggering condition being met. Additionally, a script may also be run to specify when the communication is sent, such as to employ logic based on a number of input conditions. A throttle option 1122 may also be selected to throttle formation and transmission of the communications, e.g., in instances in which a number of communications to be sent would exceed a threshold. In this way, a communication may be created that is to be formed dynamically responsive to triggering conditions of a search being met and that includes tokens that are based on values of fields involved in the search.

Figure 12:
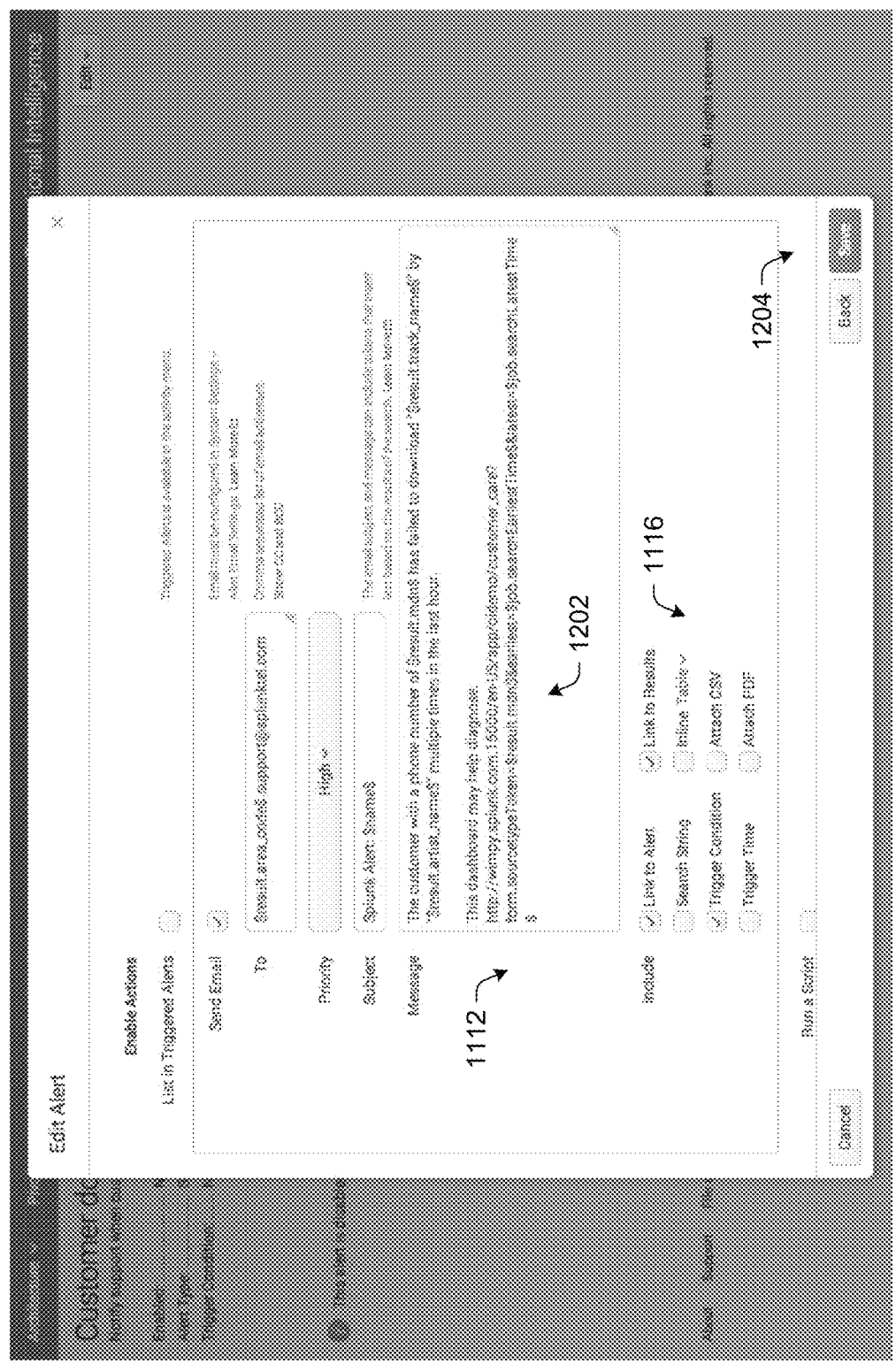
FIG. 12 depicts an example of a user interface in which a result of selection of an option to include a link to results is shown.

FIG. 12 depicts an example of a user interface 1200 in which a result of selection of an option to include a link to results is shown. Continuing with the previous example, a user has selected a format 1116 option to include a link to results. Accordingly, a message body 1112 of the communication includes a link 1202 that is selectable to navigate to a network address from which the results are viewable. Once the communication is configured, the user may then select an option 1204 to save the alert.

Figure 13:
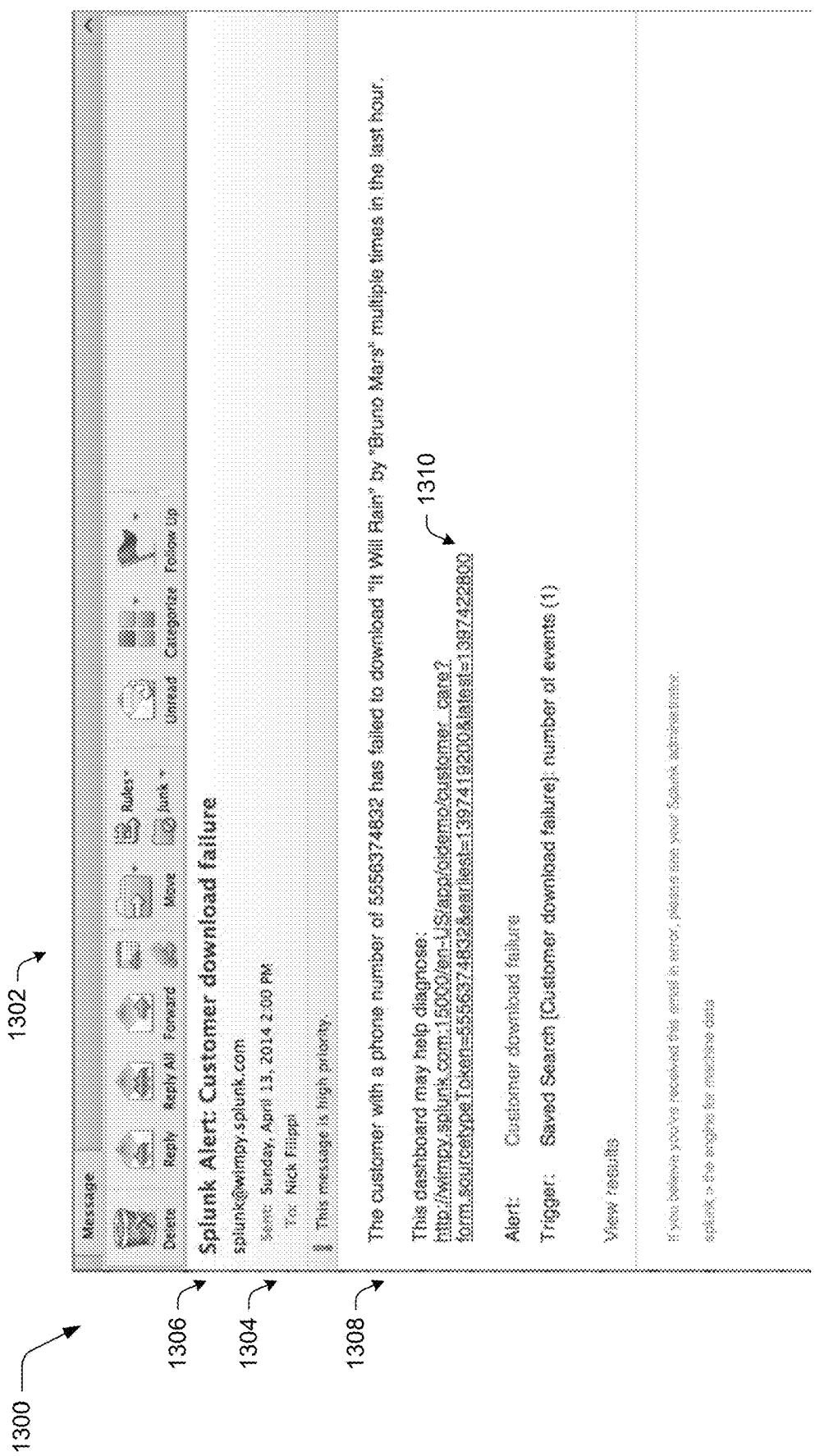
FIG. 13 depicts an example of a user interface depicting an example of a communication that is transmitted responsive to trigger conditions of an alert being met.

FIG. 13 depicts an example of a user interface 1300 depicting an example of a communication 1302 that is transmitted responsive to trigger conditions of an alert being met. The communication 1304 has been addressed to an intended recipient dynamically using a token as described for the recipient 1104 option of FIG. 11. Likewise, the communication 1304 also includes a dynamic subject line 1306 and message body 1308 using tokens that are based on values of fields by extraction rules used to perform the search.

Figure 14:
FIG. 14 depicts an example of a user interface that is displayable via navigation to the network address of the results of the search of FIG. 13.

For example, the message body 1308 includes tokens includes a phone number, song name, and artist involved in the search. The message body 1308 also includes a link 1310 that is selectable to navigate to a network address, via which, data results from the search may be viewed. An example 1400 of a user interface that is displayable via navigation to the network address of the results of the search is shown in FIG. 14. In this way, a communication may be configured to support dynamic formation through inclusion of tokens based on values of fields found by search data using extraction rules of a late-binding schema. Further discussion of tokenization of search results may be found in relation to the following and is shown in corresponding figures.

Example Alert Structure

Figure 15:
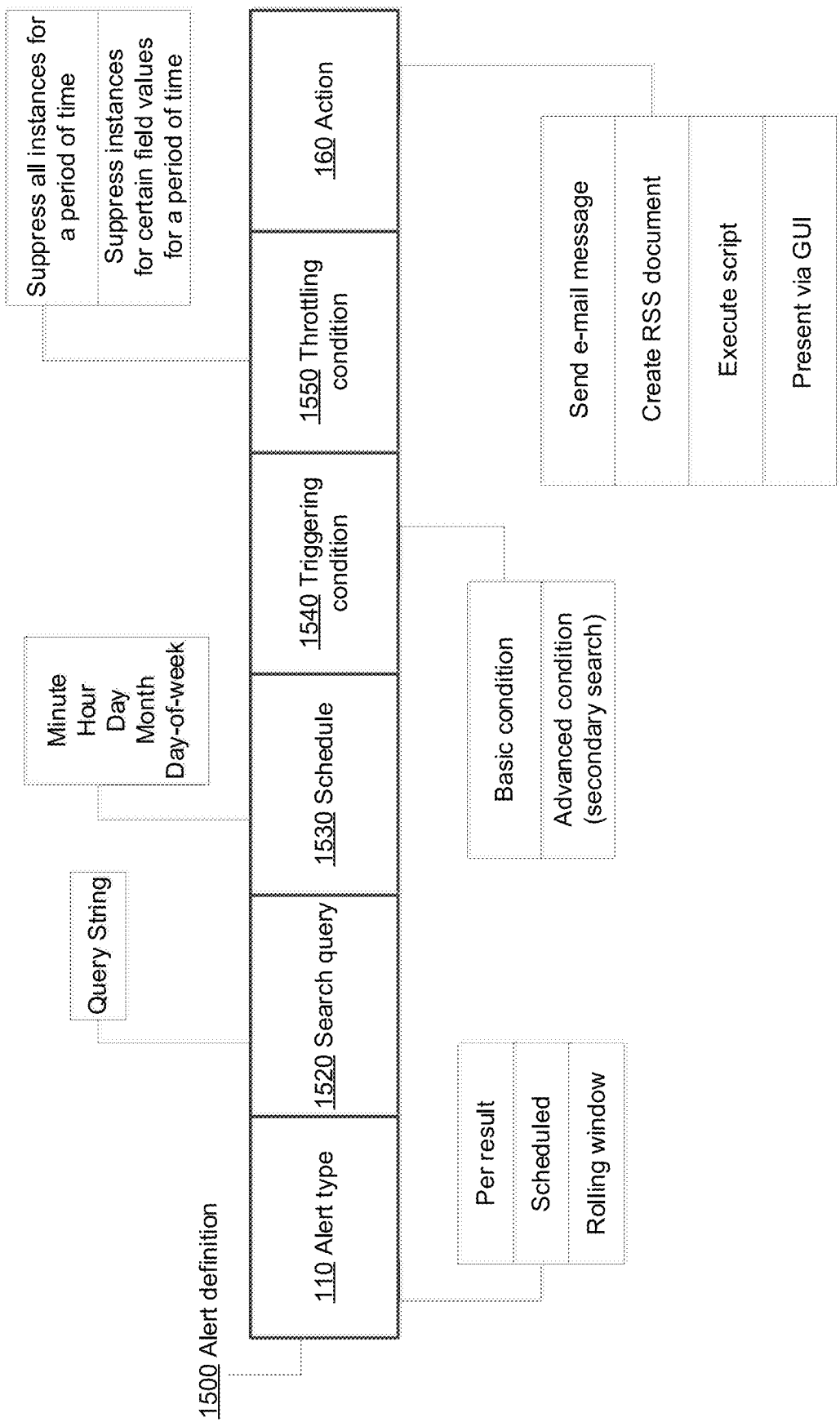
FIG. 15 schematically illustrates an example structure that may be utilized by the systems and methods described herein for defining alerts in accordance with one or more aspects of the present techniques.

FIG. 15 schematically illustrates an example structure that may be utilized by the systems and methods described herein for defining alerts in accordance with one or more aspects of the present techniques. As schematically illustrated by FIG. 15, an alert definition 1500 may comprise an alert type 1510, a search query 1520 (e.g., a query string and a time range over which the search is to happen), a schedule 1530, a triggering condition 1540, a throttling condition 1550, and one or more actions 1560. It should be noted that an alert definition 1500 may include more, less or different alert characteristics than those shown in FIG. 1.

In various illustrative examples, alert type 1510 may be represented by "per result," "scheduled," or "rolling window" alerts, as described in more details herein above.

Search query 1520 may be represented by a search query string comprising one or more search terms. The search query string may satisfy to the syntax of a certain query language supported by the data aggregation and retrieval systems.

Schedule 1530 may be represented by a structure comprising values of one or more scheduling parameters (e.g., minute, hour, day, month, and/or day-of-week).

In another illustrative example, triggering condition 1540 may comprise comparing the number of data items in the dataset produced by executing the search query associated with the alert to a certain configurable integer value. In another illustrative example, triggering condition 1540 may comprise a secondary search on the dataset produced by executing the search query associated with the alert, as described in more details herein above.

Throttling condition 1550 may be utilized to suppress triggering certain alert instances. In an illustrative example, a throttling condition may be used to suppress triggering alert instances for a certain period of time following a previous instance of the alert. Alternatively, an alert definition may comprise a throttling condition to suppress, for a certain period of time, triggering alert instances for certain data items in the dataset produced by executing the search query, as described in more details herein above.

Action 1560 may specify one or more actions to be performed by the system responsive to triggering an instance of the alert. The actions may include, for example, sending an e-mail message to certain recipients, creating an RSS feed including at least part of the dataset that has triggered the alert instance, executing a shell script, and/or presenting the alert via a GUI of a client computing device, as described in more details herein above.

In certain implementations, the system may be configured to present, on a client computing device, communications may be configured as alert summaries rather than individual alert instances. An alert summary may be associated with a particular alert, and may comprise and one or more counts of alert instances (e.g., a total count of alert instances and/or a count of alert instances that have not been viewed by a user). An alert summary may further comprise other information associated with the alert, such as a textual or graphic identifier of the alert, a description of the alert, a source of the alert, etc.

In certain implementations, the system may allow a user to "drill down" to the underlying data that has triggered a particular alert instance: responsive to receiving the user's selection (e.g., via a GUI associated with the client computing device) of a particular alert summary, the system may display individual alert instances represented by the summary. The user may then further select an individual alert instance. Responsive to receiving the user's selection of a particular alert instance, the system may display the underlying portion of the dataset that has triggered the alert instance. In various illustrative examples, the client computing device may be provided by a mobile computing device (e.g., a smartphone) and/or a desktop computing device (e.g., a personal computer).

As noted herein above, the system may maintain, for each alert summary, a total count of alert instances associated with the alert represented by the alert summary, and a count of alert instances that have been accessed by a client computing device (and presumably viewed by the user). In certain implementations, the system may track and synchronize counts of alert instances that may be accessed by two or more client computing devices.

In certain implementations, the system may track alert instances that have been accessed by a client computing device, alert instances that have not been accessed by the client computing device, or alert instances irrespective of whether those have been accessed by the client computing device. The alert notifications transmitted by the system to the client computing device may include the number of read, unread, or all alert instances in one or more alert categories.

Figure 16:
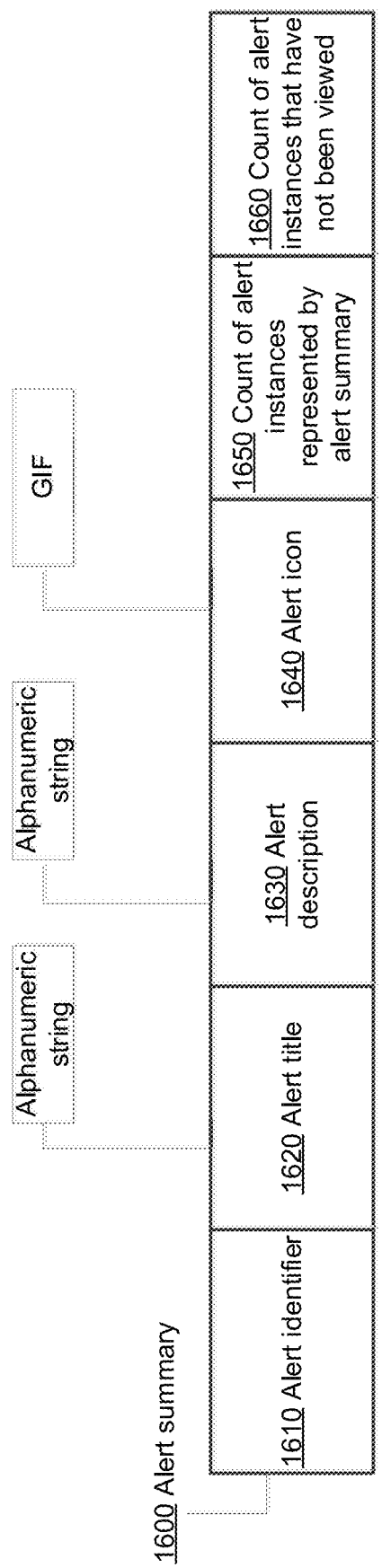
FIG. 16 schematically illustrates an example data structure that may be utilized by the systems and methods described herein for storing an alert summary in accordance with one or more aspects of the present disclosure.

FIG. 16 schematically illustrates an example structure that may be utilized by the systems and methods described herein for configuring an alert summary in accordance with one or more aspects of the present disclosure. As schematically illustrated by FIG. 16, a structure 1600 representing an alert summary may comprise an alert identifier 1610 to identify an alert for which the summary is stored by the structure 1600. In an illustrative example, alert identifier 1610 may be provided by a pointer to (or other identifier of) a structure 1600 defining the alert.

In certain implementations, structure 1600 may further comprise an alert title 1620 which may be utilized by a client computing device in displaying the alert summary. In an illustrative example, alert title 1620 may be provided by an alphanumeric string.

In certain implementations, structure 1600 may further comprise an alert description 1630 which may be utilized by a client computing device in displaying the alert summary. In an illustrative example, alert description 1630 may be provided by an alphanumeric string.

In certain implementations, structure 1600 may further comprise an identifier 1640 of a graphical icon which may be utilized by a client computing device in displaying the alert summary. In an illustrative example, alert icon 1640 may be provided by a GIF or JPEG image.

Structure 1600 may further comprise a total count 1650 of alert instances represented by the alert summary. Count 1650 may be equal to a total number of alert instances generated by the alert identified by alert identifier 1610. In certain implementations, count 1650 may be equal to a total number of alert instances generated by the alert identified by alert identifier 1610 within a certain period of time (e.g., within the last 24 hours).

Structure 1600 may further comprise a count 1660 of alert instances that have not been accessed by a client computing device (and thus presumably have not been viewed by a user). In certain implementations, the system may track and synchronize counts of alert instances that may be accessed by two or more client computing devices.

In certain implementations, one or more structures 1600 may be implemented as a one- or two-dimensional array or as another suitable structure defined for the computing platform on which the data aggregation and analysis system is running.

In certain implementations, an alert summary may be transmitted to and/or displayed by two or more client computing devices which may be operated by one or more users. A server (such as a presentation server acting as an intermediary between one or more search servers and a plurality of client computing devices) may track and synchronize counts of alert instances associated with a plurality of alerts defined in the system. The server may be configured to increment one or more counts of alert instances (e.g., a total count of alert instances and/or a count of alert instances that have not been viewed by a user) associated with a particular alert responsive to receiving a notification (e.g., from a search server) that a new instance of the alert has been generated. Each client computing device may be configured to transmit, to the server, changes in the access status of alert instances that have been displayed by the client computing device. In an illustrative example, whenever an alert instance has been displayed by a client computing device, the client computing device may set the status of the alert instance to "has been accessed" and notify the server of the updated status of the alert instance. Responsive to receiving the notification, the server may decrement the count of alert instances (associated with a particular alert) that have not been accessed by a client, and thus presumably have not been viewed by a user.

Alternatively, tracking and synchronization counts of alert instances may be performed by one or more client computing devices. In an illustrative example, one or more client computing devices may be configured to increment one or more counts of alert instances (e.g., a total count of alert instances and/or a count of alert instances that have not been viewed by a user) associated with a particular alert responsive to receiving a notification (e.g., from a search server) that a new instance of the alert has been generated. The client computing devices may be further configured set the status of the alert instance to "has been accessed" and transmit a multicast or broadcast message to other client computing devices to notify them of the changed status of the alert instance whenever an alert instance has been accessed by the client computing device. Responsive to receiving such a notification, each client computing device may decrement the count of alert instances (associated with a particular alert) that have not been accessed by a client, and thus presumably have not been viewed by a user.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-18.

FIG. 19 depicts a procedure 1900 in an example implementation in which detection of a triggering condition causes formation of a communication that includes one or more tokens based on one or more values of data taken from field defined by one or more extraction rules. A triggering condition is detected by one or more computing devices that is found by searching data using one or more extraction rules of a late-binding schema (block 1902). A system 100 of FIG. 1, for instance, may utilize a late-binding schema at search time to search data stores. Results from extraction rules used to perform the search may be used to detect occurrence of a triggering condition, e.g., a number of failures over a threshold and so forth.

Responsive to the detection of the triggering condition of the alert, a communication is formed by the one or more computing devices that corresponds to the alert and that includes one or more tokens based on one or more values of the data taken from fields defined by the one or more extraction rules (block 1904). The communication, for instance, may be formed to use tokens that are based directly or indirectly on the data resulting from the search. The tokens may be used in a variety of ways, such as to specify a recipient, used with static verbiage in a subject line or message body, and so forth. Formation of the communication may also include specifying a priority level, options to include metadata, formats to include results of the search, and so forth.

The communication is caused to be transmitted by the one or more computing device via a network for receipt by at least one computing device of an intended recipient of the communication (block 1906). The communication, for instance, may be transmitted for receipt by an intended recipient that is determined dynamically from the results of the search, a static recipient (e.g., customer service personnel), and so forth. Additionally, the communication may take a variety of different forms, such as an email, instant message, social network communication, text message, and so forth as previously described.

Example System and Device

Figure 20:
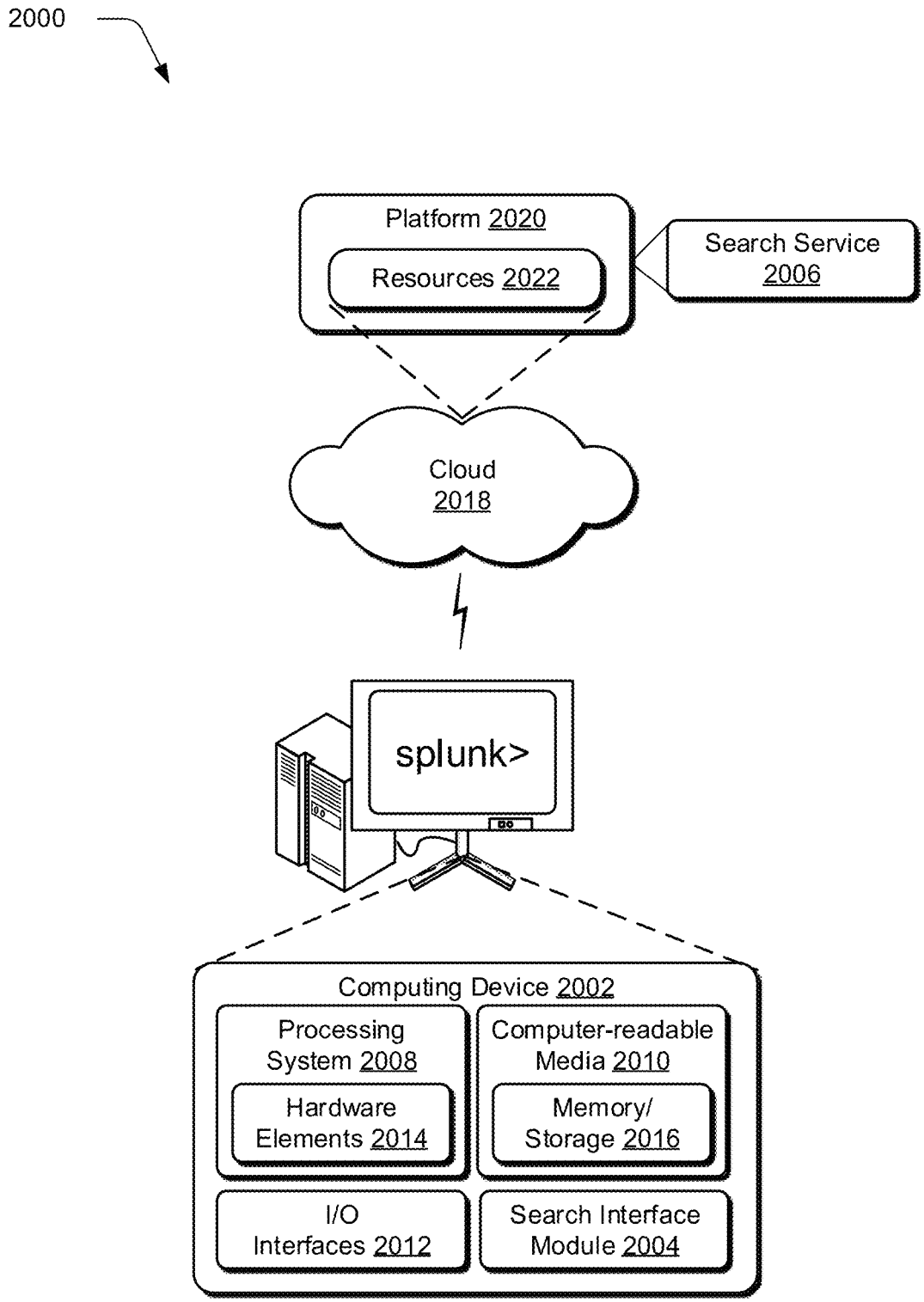
FIG. 20 illustrates an example system including various components of an example device that can be implemented as any type of computing device as described and/or utilize with reference to FIGS. 1-19 to implement embodiments of the techniques described herein.

FIG. 20 illustrates an example system generally at 2000 that includes an example computing device 2002 that is representative of one or more computing systems and/or devices that may implement the various techniques described herein. This is illustrated through inclusion of the search interface module 2004 that is representative of functionality to interact with a search service 2006, e.g., to specify and manage searches using a late-binding schema and events as described above and thus may correspond to the client application module 106 and system 100 of FIG. 1. The computing device 2002 may be, for example, a server of a service provider, a device associated with a client (e.g., a client device), an on-chip system, and/or any other suitable computing device or computing system.

The example computing device 2002 as illustrated includes a processing system 2008, one or more computer-readable media 2010, and one or more I/O interface 2012 that are communicatively coupled, one to another. Although not shown, the computing device 2002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2008 is representative of functionality to perform one or more operations using hardware. Accordingly, the processing system 2008 is illustrated as including hardware element 2014 that may be configured as processors, functional blocks, and so forth. This may include implementation in hardware as an application specific integrated circuit or other logic device formed using one or more semiconductors. The hardware elements 2014 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2010 is illustrated as including memory/storage 2016. The memory/storage 2016 represents memory/storage capacity associated with one or more computer-readable media. The memory/storage component 2016 may include volatile media (such as random access memory (RAM)) and/or nonvolatile media (such as read only memory (ROM), Flash memory, optical disks, magnetic disks, and so forth). The memory/storage component 2016 may include fixed media (e.g., RAM, ROM, a fixed hard drive, and so on) as well as removable media (e.g., Flash memory, a removable hard drive, an optical disc, and so forth). The computer-readable media 2010 may be configured in a variety of other ways as further described below.

Input/output interface(s) 2012 are representative of functionality to allow a user to enter commands and information to computing device 2002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2014 and computer-readable media 2010 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2014. The computing device 2002 may be configured to implement particular instructions and/or functions corresponding to the software and/or hardware modules. Accordingly, implementation of a module that is executable by the computing device 2002 as software may be achieved at least partially in hardware, e.g., through use of computer-readable storage media and/or hardware elements 2014 of the processing system 2008. The instructions and/or functions may be executable/operable by one or more articles of manufacture (for example, one or more computing devices 2002 and/or processing systems 2008) to implement techniques, modules, and examples described herein.

The techniques described herein may be supported by various configurations of the computing device 2002 and are not limited to the specific examples of the techniques described herein. This functionality may also be implemented all or in part through use of a distributed system, such as over a "cloud" 2018 via a platform 2020 as described below.

The cloud 2018 includes and/or is representative of a platform 2020 for resources 2022. The platform 2020 abstracts underlying functionality of hardware (e.g., servers) and software resources of the cloud 2018. The resources 2022 may include applications and/or data that can be utilized while computer processing is executed on servers that are remote from the computing device 2002. Resources 2022 can also include services provided over the Internet and/or through a subscriber network, such as a cellular or Wi-Fi network.

The platform 2020 may abstract resources and functions to connect the computing device 2002 with other computing devices. The platform 2020 may also serve to abstract scaling of resources to provide a corresponding level of scale to encountered demand for the resources 2022 that are implemented via the platform 2020. Accordingly, in an interconnected device embodiment, implementation of functionality described herein may be distributed throughout the system 2000. For example, the functionality may be implemented in part on the computing device 2002 as well as via the platform 2020 that abstracts the functionality of the cloud 2018.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method, comprising:
   receiving, from a user interface, an assignment of a triggering condition of an alert to a search query in an alert definition that specifies the triggering condition and the search query for use in continual evaluation of the triggering condition against search results of the search query during execution of the search query, the execution determining the search results as a subset of events that meet criteria specified by the search query,
   wherein the search query is performed on the events in a data store, each event including a portion of raw machine data associated with a timestamp,
   wherein the criteria specified by the search query includes at least a field that is defined by an extraction rule for extracting a subportion of text from the portion of raw machine data in an event to produce a value for the field for the event; and
   based at least in part on performance of the evaluation according to the alert definition, causing display of an indication of the alert on a user device associated with the alert.

2. The computer-implemented method of claim 1, wherein the execution of the search query on the events in the data store comprises mapping the field to the extraction rule to produce values for the field for the events, and determining the search results based on the values for the field for the events.

3. The computer-implemented method of claim 1, further comprising receiving the indication of the alert in a communication corresponding to the alert, the communication including one or more tokens based on one or more values of the field defined by the extraction rule, wherein the causing of the display is based on the receiving of the communication.

4. The computer-implemented method of claim 1, wherein the indication includes the value for a given event of the search results based on the value satisfying at least partially the triggering condition involving the field.

5. The computer-implemented method of claim 1, wherein the indication includes a token that is based on the value for a given event of the search results satisfying at least partially the triggering condition involving the field.

6. The computer-implemented method of claim 1, wherein the evaluation of the triggering condition and the execution of the search query are each performed continually in real time based on receiving, from the user interface, a selection of an option to search for and detect alerts in real time.

7. The computer-implemented method of claim 1, wherein the evaluation against the search results of the search query is performed during the execution of the search query within in a time range based on receiving, from the user interface, user input that specifies the time range in which to detect alerts.

8. The computer-implemented method of claim 1, wherein the triggering condition specifies an amount of the search results that are to be found during the execution of the search query in order to trigger the alert.

9. The computer-implemented method of claim 1, wherein the triggering condition specifies an amount of sources that are to be found from of the search results during the execution of the search query in order to trigger the alert.

10. The computer-implemented method of claim 1, wherein the triggering condition specifies an amount of hosts that are to be found from the search results during the execution of the search query in order to trigger the alert.

11. The computer-implemented method of claim 1, wherein the triggering condition comprises a custom condition that is to be met during the execution of the search query in order to trigger the alert, the custom condition being specified by a logical expression.

12. The computer-implemented method of claim 1, wherein the indication of the alert comprises a dynamic message body that includes at least some static text and at least one token that is based on the search results.

13. The computer-implemented method of claim 1, wherein the indication of the alert comprises a search string that specifies the search query that triggered the alert, and the alert definition includes the search string.

14. The computer-implemented method of claim 1, further comprising receiving, from the user interface, a selection of a throttle option to throttle formation and transmission of communications that correspond to the alert when a number of the communications would exceed a threshold.

15. The computer-implemented method of claim 1, wherein the causing the display of the indication of the alert on the user device associated with the alert comprises providing the indication as a view of data results from the execution of the search query for the display on the user device.

16. A computer-implemented system comprising:
    one or more processors, and one or more computer memory to store instructions, the instructions when executed by the one or more processors to perform operations comprising:
    receiving, from a user interface, an assignment of a triggering condition of an alert to a search query in an alert definition that specifies the triggering condition and the search query for use in continual evaluation of the triggering condition against search results of the search query during execution of the search query, the execution determining the search results as a subset of events that meet criteria specified by the search query,
wherein the search query is performed on the events in a data store, each event including a portion of raw machine data associated with a timestamp,
wherein the criteria specified by the search query includes at least a field that is defined by an extraction rule for extracting a subportion of text from the portion of raw machine data in an event to produce a value for the field for the event; and
based at least in part on performance of the evaluation according to the alert definition, causing display of an indication of the alert on a user device associated with the alert.

17. The computer-implemented system of claim 16, wherein the execution of the search query on the events in the data store comprises mapping the field to the extraction rule to produce values for the field for the events, and determining the search results based on the values for the field for the events.

18. The computer-implemented system of claim 16, wherein the operations further comprise receiving the indication of the alert in a communication corresponding to the alert, the communication including one or more tokens based on one or more values of the field defined by the extraction rule, wherein the causing of the display is based on the receiving of the communication.

19. The computer-implemented system of claim 16, wherein the indication includes the value for a given event of the search results based on the value satisfying at least partially the triggering condition involving the field.

20. The computer-implemented system of claim 16, wherein the indication includes a token that is based on the value for a given event of the search results satisfying at least partially the triggering condition involving the field.

21. The computer-implemented system of claim 16, wherein the evaluation against the search results of the search query is performed during the execution of the search query continually in real time based on receiving, from the user interface, a selection of an option to search for and detect alerts in real time.

22. The computer-implemented system of claim 16, wherein the evaluation against the search results of the search query is performed during the execution of the search query within in a time range based on receiving, from the user interface, user input that specifies the time range in which to detect alerts.

23. One or more computer-readable storage media comprising instructions stored thereon that, responsive to execution by one or more computing devices, causes the one or more computing devices to perform operations comprising:
receiving, from a user interface, an assignment of a triggering condition of an alert to a search query in an alert definition that specifies the triggering condition and the search query for use in continual evaluation of the triggering condition against search results of the search query during execution of the search query, the execution determining the search results as a subset of events that meet criteria specified by the search query,
wherein the search query is performed on the events in a data store, each event including a portion of raw machine data associated with a timestamp,
wherein the criteria specified by the search query includes at least a field that is defined by an extraction rule for extracting a subportion of text from the portion of raw machine data in an event to produce a value for the field for the event; and
based at least in part on performance of the evaluation according to the alert definition, causing display of an indication of the alert on a user device associated with the alert.

24. The computer-readable storage media of claim 23, wherein the execution of the search query on the events in the data store comprises mapping the field to the extraction rule to produce values for the field for the events, and determining the search results based on the values for the field for the events.

25. The computer-readable storage media of claim 23, wherein the operations further comprise receiving the indication of the alert in a communication corresponding to the alert, the communication including one or more tokens based on one or more values of the field defined by the extraction rule, wherein the causing of the display is based on the receiving of the communication.

26. The computer-readable storage media of claim 23, wherein the indication includes the value for a given event of the search results based on the value satisfying at least partially the triggering condition involving the field.

27. The computer-readable storage media of claim 23, wherein the indication includes a token that is based on the value for a given event of the search results satisfying at least partially the triggering condition involving the field.

28. The computer-readable storage media of claim 23, wherein the evaluation against the search results of the search query is performed during the execution of the search query continually in real time based on receiving, from the user interface, a selection of an option to search for and detect alerts in real time.

29. The computer-readable storage media of claim 23, wherein the evaluation against the search results of the search query is performed during the execution of the search query within in a time range based on receiving, from the user interface, user input that specifies the time range in which to detect alerts.

30. The computer-readable storage media of claim 23, wherein the triggering condition specifies an amount of the search results that are to be found during the execution of the search query in order to trigger the alert.

* * * * *